(12) United States Patent
Chen et al.

(10) Patent No.: US 11,712,826 B2
(45) Date of Patent: Aug. 1, 2023

(54) INJECTION MOLDING SYSTEM AND INJECTION MOLDING METHOD

(71) Applicant: OTRAJET INC., Taichung (TW)

(72) Inventors: Ching-Hao Chen, Taichung (TW); Liang-Hui Yeh, Taichung (TW)

(73) Assignee: OTRAJET INC.

( * ) Notice: Subject to any disclaimer, the term of this patent is extended or adjusted under 35 U.S.C. 154(b) by 284 days.

(21) Appl. No.: 16/748,374

(22) Filed: Jan. 21, 2020

(65) Prior Publication Data

US 2021/0008767 A1 Jan. 14, 2021

Related U.S. Application Data

(60) Provisional application No. 62/950,454, filed on Dec. 19, 2019, provisional application No. 62/915,287, filed on Oct. 15, 2019.

(30) Foreign Application Priority Data

Jul. 9, 2019 (TW) .................................. 108124178

(51) Int. Cl.
*B29C 44/42* (2006.01)
*B29C 44/02* (2006.01)
(Continued)

(52) U.S. Cl.
CPC ............ *B29C 44/425* (2013.01); *B29C 44/02* (2013.01); *B29C 44/427* (2013.01); *B29C 44/60* (2013.01);
(Continued)

(58) Field of Classification Search
CPC ... B29C 44/427; B29C 44/425; B29C 44/581; B29C 45/0408; B29C 45/06
See application file for complete search history.

(56) References Cited

U.S. PATENT DOCUMENTS 3,448,490 A * 6/1969 DeRyck ................. B29C 45/04
                                                                                         425/119
3,871,806 A     3/1975  Leunig
(Continued)

FOREIGN PATENT DOCUMENTS

CA        2726172 A1 * 12/2009  .......... B29C 44/348
CN      103895146 A     7/2014
(Continued)

OTHER PUBLICATIONS

Translation of DE 33 12 830 (Year: 1984).*
(Continued)

*Primary Examiner* — Xiao S Zhao
*Assistant Examiner* — John J DeRusso
(74) *Attorney, Agent, or Firm* — WPAT Law; Anthony King

(57) ABSTRACT

An injection-molding system includes an extruding system configured to produce a mixture; a discharging channel communicable with the extruding system and including an outlet configured to discharge the mixture; and molding devices configured to receive the mixture. Each of the molding devices includes a hollow space, and a feeding port communicable with the hollow space and engageable with the outlet. An injection-molding method includes providing an extruding system configured to produce a mixture, a discharging channel including an outlet, and first and second molding devices; engaging the outlet with the first molding device; injecting the mixture into the first molding device; disengaging the outlet from the first molding device; moving the discharging channel away from the first molding device and toward the second molding device; engaging the outlet with the second molding device; injecting the mixture into the second molding device; and disengaging the outlet from the second molding device.

19 Claims, 34 Drawing Sheets

(51) Int. Cl.
  *B29C 44/60* (2006.01)
  *B29C 45/04* (2006.01)
  *B29C 45/07* (2006.01)
  *B29C 45/13* (2006.01)
  *B29C 44/58* (2006.01)
  *B29K 105/04* (2006.01)
  *B29C 45/06* (2006.01)

(52) U.S. Cl.
  CPC .......... *B29C 45/0408* (2013.01); *B29C 45/06* (2013.01); *B29C 45/076* (2013.01); *B29C 45/13* (2013.01); *B29C 44/581* (2013.01); *B29K 2105/04* (2013.01)

(56) References Cited

U.S. PATENT DOCUMENTS

| | | | |
|---|---|---|---|
| 3,945,535 A * | 3/1976 | Leiste | B29C 44/0492 |
| | | | 425/549 |
| 11,267,175 B2 * | 3/2022 | Yeh | B29C 44/42 |
| 2004/0135277 A1 | 7/2004 | Frey | |
| 2006/0172039 A1 * | 8/2006 | Imai | B29C 45/062 |
| | | | 425/595 |
| 2007/0052124 A1 | 3/2007 | Park et al. | |
| 2014/0061960 A1 | 3/2014 | Rosan | |
| 2019/0099926 A1 | 4/2019 | Okkema | |
| 2021/0107192 A1 * | 4/2021 | Yeh | B29C 45/30 |

FOREIGN PATENT DOCUMENTS

| | | | | |
|---|---|---|---|---|
| CN | 107073768 B | 4/2020 | | |
| DE | 3312830 A1 | 10/1984 | | |
| DE | 102009060526 A1 * | 6/2011 | ............ | B29C 43/08 |
| FR | 2745226 A1 * | 8/1997 | ........... | B29C 44/427 |
| GB | 1018178 A | 1/1966 | | |
| JP | 11976049780 U | 4/1976 | | |
| JP | H08-090595 A | 4/1996 | | |
| JP | 2000084968 A | 3/2000 | | |
| JP | 2001150504 A | 6/2001 | | |
| JP | 2001150504 A * | 6/2001 | | |
| JP | 2002144366 A | 5/2002 | | |
| JP | 2002331544 A | 11/2002 | | |
| JP | 2003127198 A | 5/2003 | | |
| JP | 2010519079 A | 6/2010 | | |
| JP | 2010-269518 A | 12/2010 | | |
| JP | 2018001738 A | 1/2018 | | |
| KR | 20010103638 A | 11/2001 | | |
| TW | 200936352 A | 9/2009 | | |
| TW | 200946315 A | 11/2009 | | |
| WO | 2008102224 A1 | 8/2008 | | |

OTHER PUBLICATIONS

Translation of DE 10 2009 060 526 (Year: 2011).*
Translation of FR-2745226-A1 (Year: 1997).*
Translation of JP-2001150504-A (Year: 2001).*
Notice of allowance and List of Cited References dated Oct. 5, 2021 issued by the Japan Patent Office of Japanese patent application No. 2020-110566.
Summary Translation of the Notice of allowance and List of Cited References dated Oct. 5, 2021 issued by the Japan Patent Office of Japanese patent application No. 2020-110566.
English Abstract of JP2002144366A.
English Abstract of CN103895146A.
English Abstract of JPH08-090595A.
English Abstract of JP2010269518A.
Office Action and Cited References from the Japan Patent Office for the Japanese patent application No. 2020-110566 dated Jun. 8, 2021.
Office Action and Cited References from the Korean Intellectual Property Office for the Korean patent application No. 10-2020-0084116 dated Jul. 1, 2021.
English abstract of JP2002331544A.
English abstract of JP2018001378A.
English abstract of KR20010103638A.
Office Action and Search Report dated Dec. 3, 2020 issued by Taiwan Intellectual Property Office for counterpart application No. 109123260.
Search Report from the European Patent Office of EP patent application No. 20173779.8-1017 dated Nov. 20, 2020.
English Abstract of JP2000084968A.
English Abstract of JP2001150504A.
Office Action and Search Report dated Mar. 3, 2022 issued by China Intellectual Property Office for counterpart application No. 202010642738.3.
Office Action from the Korean Intellectual Property Office of KR patent application No. 10-2020-0084116 dated Jan. 24, 2022.
Notice of allowance dated Nov. 2, 2022 issued by the Korean Intellectual Property Office of KR patent application No. 10-2020-0084116.
Office action, Cited References and Search report dated Nov. 28, 2022 issued by the Taiwan Intellectual Property Office (TIPO) for the Taiwanese application No. 109123260.
Office action, Cited References and Search report dated Mar. 25, 2023 issued by the Taiwan Intellectual Property Office (TIPO) for the Taiwanese application No. 109123260.

* cited by examiner

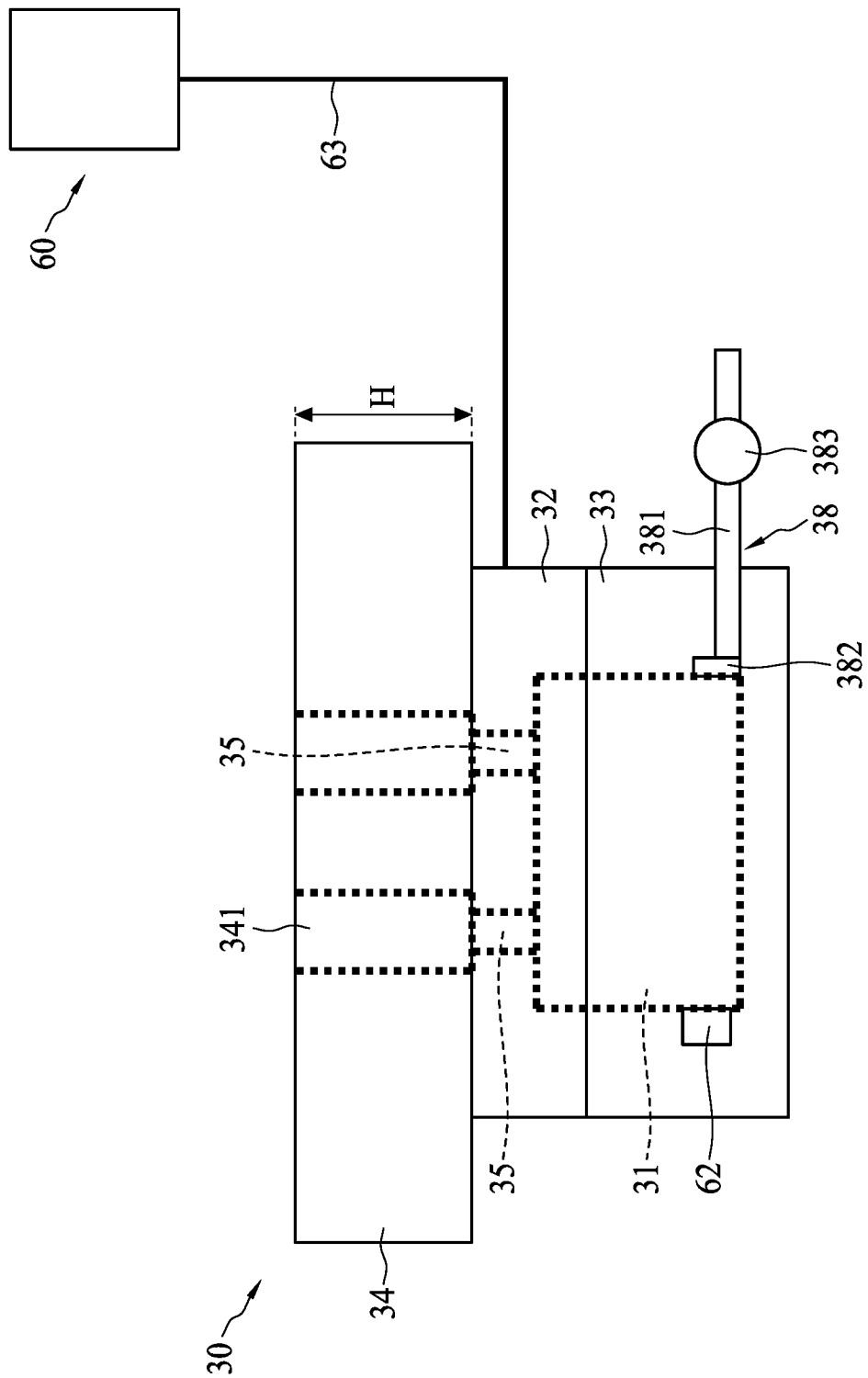

INJECTION MOLDING SYSTEM AND INJECTION MOLDING METHOD

CROSS-REFERENCE TO RELATED APPLICATION

This application claims priority of U.S. provisional application Ser. No. 62/915,287 filed on Oct. 15, 2019, U.S. provisional application Ser. No. 62/950,454 filed on Dec. 19, 2019 and Taiwanese Patent application Ser. No. 108124178 filed on Jul. 9, 2019, which are incorporated by reference in its entirety.

TECHNICAL FIELD

The present invention is related to an injection-molding system and an injection-molding method, and, in particular, to an injection-molding system and an injection-molding method for making a foamed polymeric article.

BACKGROUND

Foamed polymeric material has many advantages, such as high strength, low weight, impact resistance, thermal insulation, and others. Foamed polymeric articles can be made by injection molding or extrusion molding. For example, after the polymeric material is melted and mixed with a blowing agent to form a mixture, a force or pressure is applied to the mixture to inject or extrude the mixture into a cavity of a mold, and the mixture is foamed and cooled in the cavity to form the foamed polymeric article.

However, it is necessary to wait for a certain period of time for foaming and cooling of the mixture in the cavity before the foamed polymeric article is ready to be removed from the mold. Therefore, there is a need to improve efficiency of making the foamed polymeric article.

BRIEF SUMMARY OF THE INVENTION

One purpose of the present invention is to provide an injection-molding system and a method of injection molding.

According to one embodiment of the present disclosure, an injection-molding system is disclosed. The injection-molding system includes an extruding system, a discharging channel and a plurality of molding devices. The extruding system is configured to produce a mixture of a polymeric material and a blowing agent. The discharging channel is communicable with the extruding system and includes an outlet disposed away from the extruding system and configured to discharge the mixture. The molding devices are configured to receive the mixture from the outlet. Each of the plurality of molding devices includes a hollow space, and a feeding port communicable with the hollow space and engageable with the outlet.

According to one embodiment of the present disclosure, a method of injection molding is disclosed. The method of injection molding includes providing a mold, wherein the mold includes an extruding system configured to produce a mixture of a polymeric material and a blowing agent, a discharging channel communicable with the extruding system and including an outlet, a first molding device and a second molding device disposed adjacent to the first molding device, wherein the first molding device includes a first hollow space and a first feeding port communicable with the first hollow space and engageable with the outlet, and the second molding device includes a second hollow space and a second feeding port communicable with the second hollow space and engageable with the outlet. The method of injection molding further includes engaging the outlet with the first feeding port, injecting a first amount of the mixture into the first hollow space through the outlet and the first feeding port, and disengaging the outlet from the first feeding port. The method of injection molding further includes moving the discharging channel away from the first molding device and toward the second molding device, engaging the outlet with the second feeding port, injecting a second amount of the mixture into the second hollow space through the outlet and the second feeding port, and disengaging the outlet from the second feeding port.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 2 is a schematic diagram of a portion of an injection-molding system according to one embodiment of the present invention.

DETAILED DESCRIPTION

Figure 1:
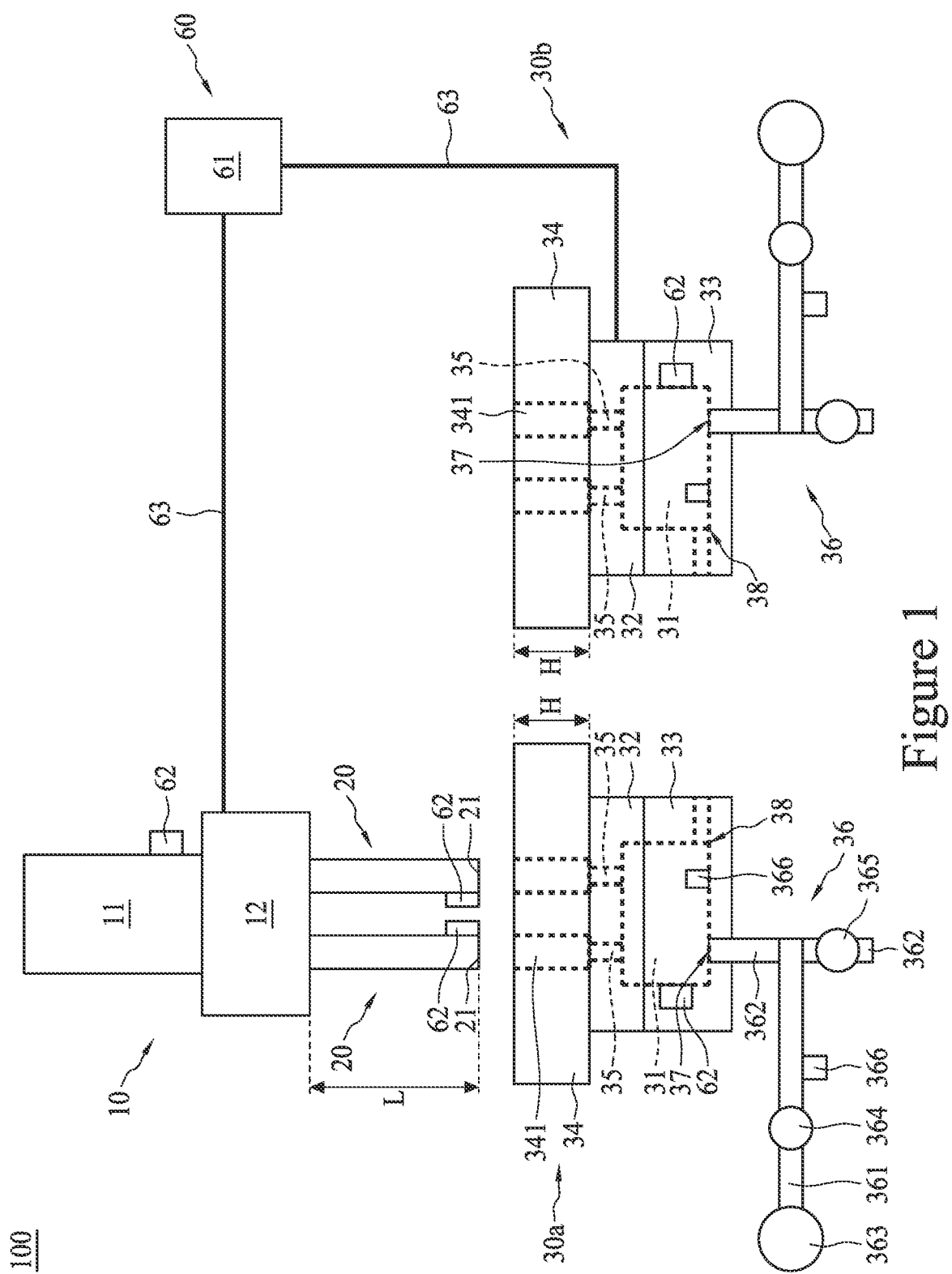
FIG. 1 is a schematic diagram of an injection-molding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic diagram of an injection-molding system 100 according to one embodiment of the present invention. The injection-molding system 100 includes an extruding system 10, a discharging channel 20 and a plurality of molding devices 30. The extruding system 10 is configured to produce the mixture of a polymeric material and a blowing agent, and configured to inject the mixture into the discharging channel 20. The extruding system 10 includes a mixing barrel 11 and an injection outlet 12. The mixing barrel 11 is configured to mix the polymeric material with the blowing agent to form the mixture, and the injection outlet 12 is configured to extrude the mixture.

The extruding system 10 is connected to or communicable with the discharging channel 20. In some embodiments, the mixture includes a high molecular weight polymer and a blowing agent. In some embodiments, the blowing agent is a physical or chemical additive that releases gas during the heating process, thereby forming pores in the thus-obtained foamed polymeric article. In some embodiments, the blowing agent is a physical additive. In some embodiments, the blowing agent is a supercritical fluid (SCF).

In some embodiments, the mixture accumulated at the mixing barrel 11 may be injected from the injection outlet 12 into the discharging channel 20. In some embodiments, one discharging channel 20 corresponds to one injection outlet 12. The mixture is flowed from one extruding system 10 or one injection outlet 12 into one discharging channel 20. In some embodiments, one injection outlet 12 corresponds to several discharging channels 20. In some embodiments, a plurality of discharging channels 20 are connected to or communicable with the injection outlet 12. In some embodiments, each of the discharging channels 20 is attached to the injection outlet 12. The number of the discharging channels 20 may be adjusted according to the property of the mixture. The discharging channels 20 are extended parallel to each other and arranged adjacent to each other. In some embodiments, each discharging channel 20 may accommodate different amounts of the mixture injected from the mixing barrel 11. The discharging channels 20 may discharge the same or different amount of the mixture into the molding device 30. In some embodiments, each discharging channel 20 may operate under different temperatures.

Each discharging channel 20 has an outlet 21 away from the injection outlet 12. In some embodiments, the outlets 21 can have different widths or diameters, and thus the outlets 21 can have different flow rates of the mixture. In some embodiments, the outlets 21 can inject different amounts of the mixture.

The discharging channels 20 may be moved, extended, or retracted synchronously or separately. In some embodiments, the outlets 21 of the discharging channels 20 may be extended into and be retracted from the molding device 30.

The number of the molding devices 30 may be adjusted according to requirements. In some embodiments, one molding device 30 corresponds to one discharging channel 20. The mixture can be flowed from the extruding system into one molding device 30 through one discharging channel 20. FIG. 1 illustrates two discharging channels 20 corresponding to one molding device 30 for clarity and simplicity, but such example is intended to be illustrative only, and is not intended to be limiting to the embodiments. A person ordinarily skilled in the art would readily understand that any suitable number of the discharging channels 20 may be utilized. Further, FIG. 1 illustrates only two molding devices 30a, 30b for clarity and simplicity, but such example is intended to be illustrative only, and is not intended to be limiting to the embodiments. A person ordinarily skilled in the art would readily understand that any suitable number of the molding devices 30a, 30b may be utilized, and all such combinations are fully intended to be included within the scope of the embodiments.

Additionally, the molding devices 30a, 30b are illustrated as having similar features, this is intended to be illustrative and is not intended to limit the embodiments, as the molding devices 30a, 30b may have similar structures or different structures in order to meet the desired functional capabilities.

Each molding device 30a, 30b includes an upper mold base 34 and a mold under the upper mold base 34. In some embodiments, the mold includes an upper mold 32 under the upper mold base 34, a lower mold 33 opposite to the upper mold 32, and a hollow space 31 defined by the upper mold 32 and lower mold 33. FIG. 1 illustrates one molding device 30 includes one mold for clarity and simplicity, but such example is intended to be illustrative only, and is not intended to be limiting to the embodiments. A person ordinarily skilled in the art would readily understand that one molding device 30 may include several molds under the upper mold base 34.

In some embodiments, the hollow space 31 is defined by the upper mold 32 and the lower mold 33. In some embodiments, the upper mold 32 and the lower mold 33 are complementary with and separable from each other. The lower mold 33 includes a lower mold cavity, and the upper mold 32 includes an upper mold cavity opposite to the lower mold cavity. In some embodiments, the hollow space 31 is formed by the upper mold cavity and the lower mold cavity. FIG. 1 illustrates one mold includes one hollow space 31 for clarity and simplicity, but such example is intended to be illustrative only, and is not intended to be limiting to the embodiments. A person ordinarily skilled in the art would readily understand that one mold may include several hollow spaces 31. For example, one mold includes two hollow spaces 31 defined by one upper mold 32 and one lower mold 33.

In some embodiments, at least one feeding port 35 is disposed at the molding device 30a, 30b. In some embodiments, the feeding port 35 is disposed over the upper mold 32 or the lower mold 33 and is communicable with the hollow space 31, the upper mold cavity or the lower mold cavity. FIG. 1 illustrates two feeding ports 35 are included in one mold for clarity and simplicity, but such example is intended to be illustrative only, and is not intended to be limiting to the embodiments. A person ordinarily skilled in the art would readily understand that one mold may include one or more feeding port 35 communicable with one hollow space 31.

The feeding port 35 is configured to dock the outlet 21. In some embodiments, several feeding ports 35 are disposed at the molding device 30a, 30b and configured to dock the corresponding outlets 21. In some embodiments, the discharging channels 20 are received by the upper mold base 34. Each discharging channel 20 is at least partially surrounded by the upper mold base 34, and the outlets 21 are docked to the feeding ports 35 respectively. The mixture can be transported from the discharging channel 20 into the hollow space 31 through the outlet 21 and the feeding port 35. In some embodiments, the feeding ports 35 can have different widths or diameters. In some embodiments, the mixture is injected into the hollow space 31 and then a foamed polymeric article is formed in the hollow space 31 after a period of time.

In some embodiments, the upper mold base 34 includes openings 341 configured to receive the corresponding discharging channels 20. Each of the openings 341 extends through the upper mold base 34. The upper mold base 34 may be mounted on the upper mold 32 by a screw, a clamp, a fastening means or the like. In some embodiments, the material of the upper mold base 34 is same as the material of the upper mold 32. In some embodiments, a width of the upper mold base 34 is greater than that of the upper mold 32 or the lower mold 33. In some embodiments, the number of openings 341 corresponds to the number of the discharging channels 20.

In some embodiments, a length L of the discharging channel 20 is related to some factors, such as a thickness H of the upper mold base 34, a clamping force for holding the molding device 30a, 30b, properties of material for making the molding device 30a, 30b, fluidity of the mixture, temperature of the mixture, or the like. In some embodiments, the thickness H of the upper mold base 34 is less than the length L of the discharging channel 20.

In order to keep the fluidity and temperature of the mixture within a predetermined range, in some embodiments, the length L of each discharging channel 20 is reduced as much as possible but is greater than the thickness H of the upper mold base 34.

Each of the molding devices 30a, 30b further includes one or more pressure-regulating systems 36. In some embodiments, each of the molding devices 30a, 30b may include different numbers of the pressure-regulating systems 36 or no pressure-regulating system 36. In some embodiments, an inner sidewall defines the hollow space 31, and a junction point 37 is in connection with the hollow space 31. In some embodiments, the inner sidewall of the hollow space 31 includes the junction point 37. In some embodiments, the junction point 37 is configured to allow a fluid or gas to enter into or exit from the hollow space 31.

The pressure-regulating system 36 may include a first gas conduit 361, a second gas conduit 362, a gas source 363, a first valve 364, a second valve 365, and a pressure-sensing unit 366. One end of the first gas conduit 361 is coupled to the junction point 37, and the other end of the first gas conduit 361 is coupled to the gas source 363. In some embodiments, the gas source 363 is configured to supply a fluid or gas, in which a suitable fluid or gas may be supplied depending on the needs; for example, the fluid or gas may be air, inert gas, etc., but the present invention is not limited thereto.

The location, shape and number of the junction point 37 are not particularly limited, and may be adjusted depending on the needs. In some embodiments, the junction point 37 is a hole. In some embodiments, the junction point 37 is disposed at the inner sidewall or the inner bottom wall of the lower mold 33 and penetrates the lower mold 33. In some embodiments, the junction point 37 is configured to supply gas and discharge gas, wherein when the first valve 364 is open and the second valve 365 is closed, the fluid or gas is supplied to the hollow space 31; when the first valve 364 is closed and the second valve 365 is open, at least a portion of the fluid or gas in the hollow space 31 is discharged.

In some embodiments, the feeding ports 35 are disposed at the inner top wall or the inner sidewall of the upper mold 32. In some embodiments, the feeding port 35 and the junction point 37 are disposed oppositely with respect to the hollow space 31; as an example but not limitation, the feeding port 35 is disposed at the inner top wall of the upper mold 32, and the junction point 37 is disposed at the inner bottom wall of the lower mold 33. In some embodiments, the feeding ports 35 are disposed at the inner top wall of the upper mold 32, and the junction point 37 is disposed at the inner sidewall of the lower mold 33. In some embodiments, the feeding port 35 is disposed at the inner sidewall of the upper mold 32, and the junction point 37 is disposed at the inner sidewall of the lower mold 33 and is located at another side opposite to the feeding port 35. In some embodiments, the feeding port 35 is away from the junction point 37.

The first valve 364 is disposed at the first gas conduit 361 and is configured to control whether the gas from the gas source 363 enters the hollow space 31 through the first gas conduit 361 and the junction point 37. The second gas conduit 362 is coupled to the junction point 37. The second valve 365 is disposed at the second gas conduit 362 and is configured to control whether the gas from the hollow space 31 is discharged via the junction point 37 through the second gas conduit 362.

In some embodiments, one end of the second gas conduit 362 is coupled to the first gas conduit 361 through the first gas conduit 361 coupled to the junction point 37. In some embodiments, the other end of the second gas conduit 362 is in communication with a space with a pressure lower than the pressure in the hollow space 31; for example, an external environment or a negative pressure space; however, the present invention is not limited thereto. The location at which the second gas conduit 362 connects with the first gas conduit 361 is not particularly limited; for example, the two may be connected at one end adjacent to an end where the first gas conduit 361 connects to the junction point 37. In some embodiments, the first valve 364 and the second valve 365 are not simultaneously open.

The pressure-sensing unit 366 is configured to sense the pressure in the hollow space 31. In some embodiments, the properties of foamed polymers are affected by the pore size and distribution across the polymer, whereas the pore size and distribution are related to the temperature, pressure, and feeding rate. The pressure-sensing unit 366 is not limited to any particular type, as long as it can sense the pressure and provide pressure information after sensing the pressure in the hollow space 31. The pressure-regulating system 36 changes the condition at which the gas exits from/enters into the hollow space 31 in accordance with the pressure information, so as to adjust the pressure in the hollow space 31, in such a manner that the foamed polymeric article thus obtained has the desired predetermined shape and property.

In some embodiments, the pressure-sensing unit 366 is disposed in the hollow space 31, the first gas conduit 361 or the second gas conduit 362. In some embodiments, the pressure-sensing unit 366 is disposed in the hollow space 31 and is away from the feeding port 35. In some embodiments, the pressure-regulating system 36 has a plurality of pressure-sensing units 366. The number and location of the plurality of pressure-sensing units 366 are not particularly limited, for example, they can be arranged at the inner sidewall of the hollow space 31 and spaced from each other, and/or anywhere in the first gas conduit 361, and/or anywhere in the second gas conduit 362; however, the present invention is not limited thereto.

In some embodiments, the injection-molding system 100 further includes a control system 60. The control system 60 is configured to control the extruding system 10, the discharging channels 20, and the molding devices 30a, 30b. In some embodiments, the control system 60 automatically controls the extruding system 10, the discharging channels 20, and the molding devices 30a, 30b in real time.

In some embodiments, the control system 60 includes a central processor 61 and a plurality of sensors 62 electrically connected to or communicable with the central processor 61. In some embodiments, the sensors 62 are placed throughout the injection-molding system 100 and configured to sense at least one processing condition (e.g., flow rate or viscosity of the mixture through the discharging channels 20, an amount of the mixture discharged from the discharging channels 20, a pressure inside the hollow space 31, etc.) at a predetermined position of the injection-molding system 100 (e.g., the sequence of extruding to each of the molding devices 30a, 30b, the alignment of the discharging channels 20 to one of the molding devices 30a, 30b, the outlet 21, the feeding port 35, and the hollow space 31, etc.). For example, at least one sensor 62 is installed at the outlet 21 for sensing the processing condition at the outlet 21. In some embodiments, the sensor 62 is configured to detect the processing condition and transmit a signal or data based on the processing condition detected to the central processor 61 for further analysis.

In some embodiments, the control system 60 controls which molding devices 30a, 30b the discharging channels 20 are docked to. In some embodiments, the cables 63 are electrically connected between the control system 60 and the extruding system 10, the discharging channels 20, and the molding devices 30a, 30b. The cables 63 are configured to transmit the signal from the molding devices 30a, 30b to the extruding system 10 and the discharging channels 20.

In some embodiments, the control system 60 is configured to process the pressure information detected by the pressure-sensing unit 366, and configured to adjust the mixing condition of the extruding system 10 and the extruding amount and timing of the discharging channels 20. In some embodiments, the pressure-sensing unit 366 provides the pressure information to the control system 60, and the control system 60 adjusts the first valve 364 and the second valve 365 in accordance with the pressure information. In some embodiments, the control system 60 adjusts the condition at which the gas enters into/exits from the hollow space 31 in real time in accordance with the pressure information, and adjust the timing and amount of the mixture injected from the discharging channels 20 into the hollow space 31, so that during the injection-molding process, the amount and rate of injection is within a suitable or predetermined range, and the pressure in the hollow space 31 is within a suitable or predetermined pressure range at all times. In some embodiments, the control system 60 further controls the feeding condition of the feeding port 35 and the gas supply condition of the gas source 363. In some embodiments, the control system 60 and the first valve 364, the second valve 365, the pressure-sensing unit 366 and the feeding port 35 are electrically connected.

Figure 1A:
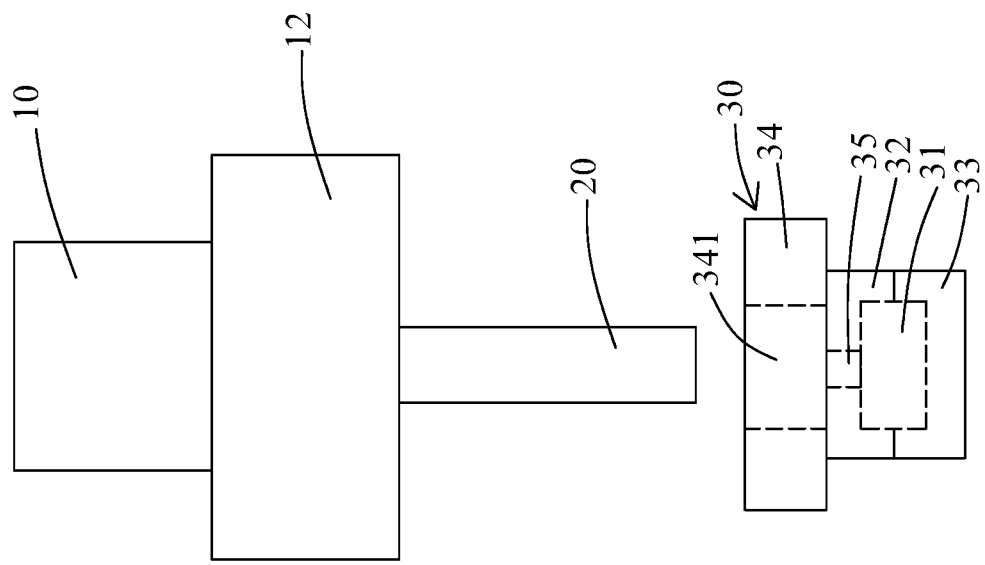
FIGS. 1A to 1G are schematic diagrams of injection-molding system in various configurations.

In some embodiments as shown in FIG. 1A, one extruding system 10 corresponds to one injection outlet 12, and one injection outlet 12 corresponds to one discharging channel 20. In other words, one extruding system 10 is connected to or communicable with one injection outlet 12, and one injection outlet 12 is connected to or communicable with one discharging channel 20. As such, the mixture can be injected into the hollow space 31 from the extruding system 10 through the injection outlet 12 and the discharging channel 20. FIG. 1A illustrates the mixture can be injected into one hollow space 31 of one mold for clarity and simplicity, but such example is intended to be illustrative only, and is not intended to be limited to the embodiments. A person ordinarily skilled in the art would readily understand that one discharging channel 20 may correspond to more than one hollow space 31, more than one mold or more than one molding device 30.

Figure 1B:
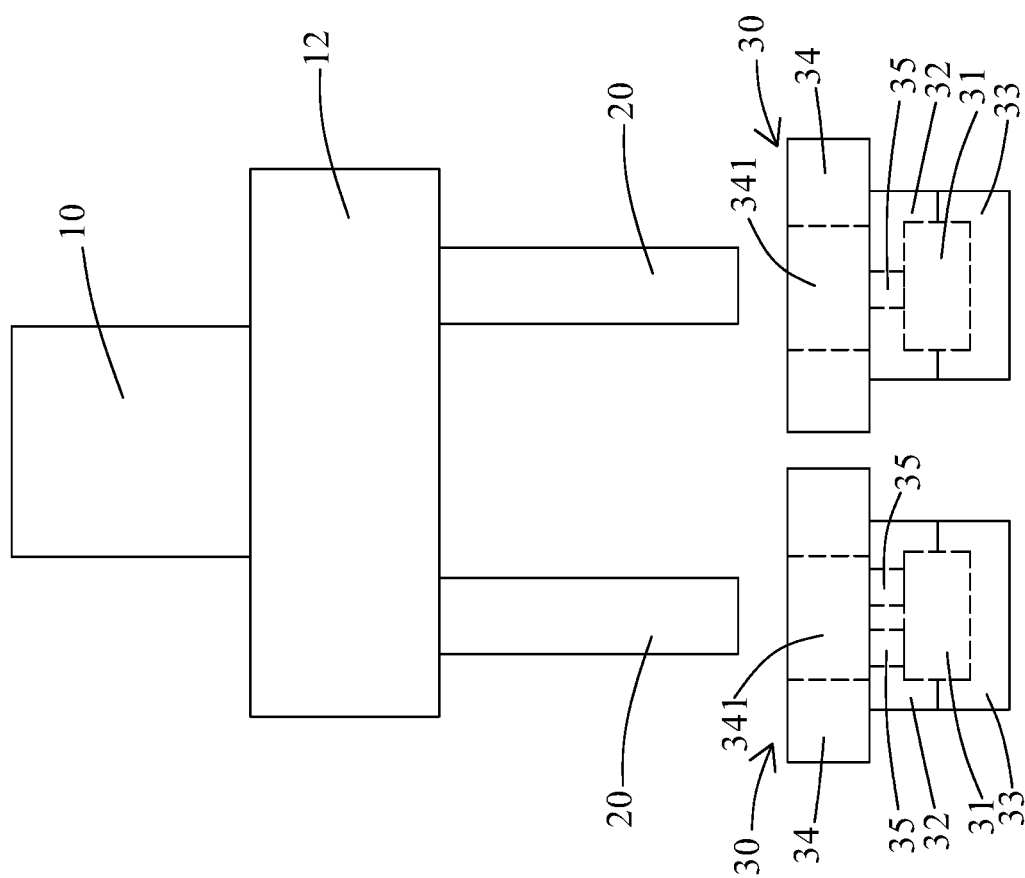

In some embodiments as shown in FIG. 1B, one extruding system 10 corresponds to one injection outlet 12, and one injection outlet 12 corresponds to several discharging channels 20. In other words, one extruding system 10 is connected to or communicable with one injection outlet 12, and one injection outlet 12 is connected to or communicable with several discharging channels 20. In some embodiments, the injection outlet 12 is connected to or communicable with each of the discharging channels 20. The mixture can be extruded to each of the discharging channels through the injection outlet 12. In some embodiments, each of the discharging channels 20 can discharge the same or different amounts of the mixture. In some embodiments, the discharging channels 20 have widths or diameters same as or different from each other. In some embodiments, the discharging channels 20 have same or different flow rates from each other. In some embodiments, since one extruding system 10 is required to supply the mixture for more than one discharging channel 20, the extruding system 10 with a relatively higher extruding power or conveying speed is required in order to be capable of providing sufficient amount of the mixture for each of the molding devices 30 within a predetermined period of time. In some embodiments, the number of discharging channels 20 is the same as the number of molding devices 30. For example as shown in FIG. 1B, there are two discharging channels 20 corresponding to two molding devices 30. FIG. 1B illustrates two discharging channels 20 and two molding devices 30 for clarity and simplicity, but such example is intended to be illustrative only, and is not intended to be limited to the embodiments. A person ordinarily skilled in the art would readily understand that suitable number of the discharging channels 20 and the molding devices 30 can be utilized, and all such combinations are fully intended to be included within the scope of the embodiments.

In some embodiments, each of the hollow spaces 31 of the molding devices 30 receives same or different amount of the mixture. In some embodiment, each of the hollow spaces 31 of the molding devices 30 receives the mixture at the same or different time. For example, the discharging channel 20 (on the left in FIG. 1B) is closed by a valve or the like and thus no mixture would be flowed into the hollow space 31 (on the left in FIG. 1B) upon flowing of the mixture from another discharging channel 20 (on the right in FIG. 1B) into the hollow space 31 (on the right in FIG. 1B).

In some embodiments, each of the molding devices 30 includes one or more of the feeding ports 35. In some embodiments, molding devices 30 may have same or different number of the feeding ports 35 from each other. For example, the molding device 30 (on the left in FIG. 1B) has two feeding ports 35 communicable with the corresponding discharging channel 20, and another molding device 30 (on the right in FIG. 1B) has one feeding port 35 communicable with the corresponding discharging channel 20. In other words, one discharging channel 20 may correspond to more than one feeding port 35.

Figure 1C:
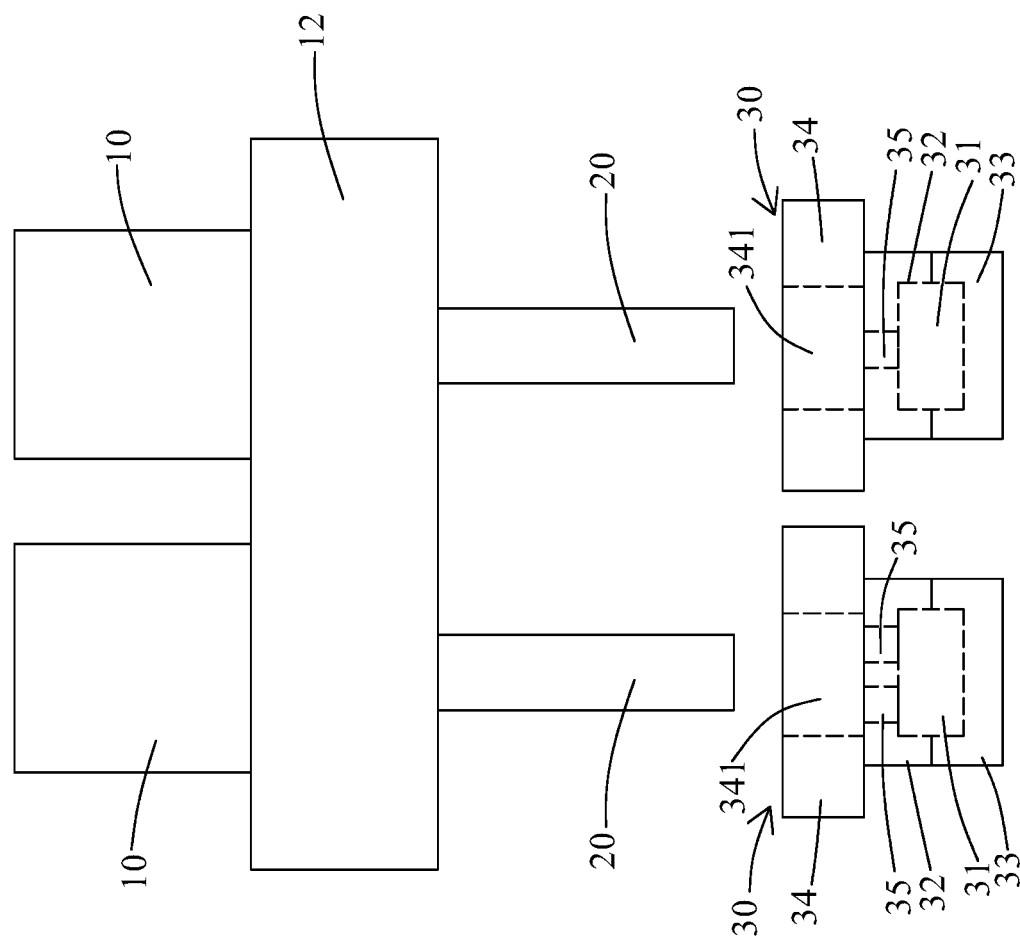

In some embodiments as shown in FIG. 1C, more than one extruding system 10 correspond to one injection outlet 12, and one injection outlet 12 corresponds to several discharging channels 20. In other words, more than one extruding system 10 are connected to or communicable with one injection outlet 12, and one injection outlet 12 is connected to or communicable with several discharging channels 20. FIG. 1C illustrates two extruding systems 10 for clarity and simplicity, but such example is intended to be illustrative only, and is not intended to be limited to the embodiments. A person ordinarily skilled in the art would readily understand that suitable number of the extruding systems 10 can be utilized, and all such combinations are fully intended to be included within the scope of the embodiments.

Compared the embodiment of FIG. 1B and the embodiment of FIG. 1C, the embodiment of FIG. 1C requires a relatively lower extruding power or conveying speed, since each of the extruding systems 10 in the embodiment of FIG. 1C is only required to supply the mixture for one of the discharging channels 20.

Figure 1D:
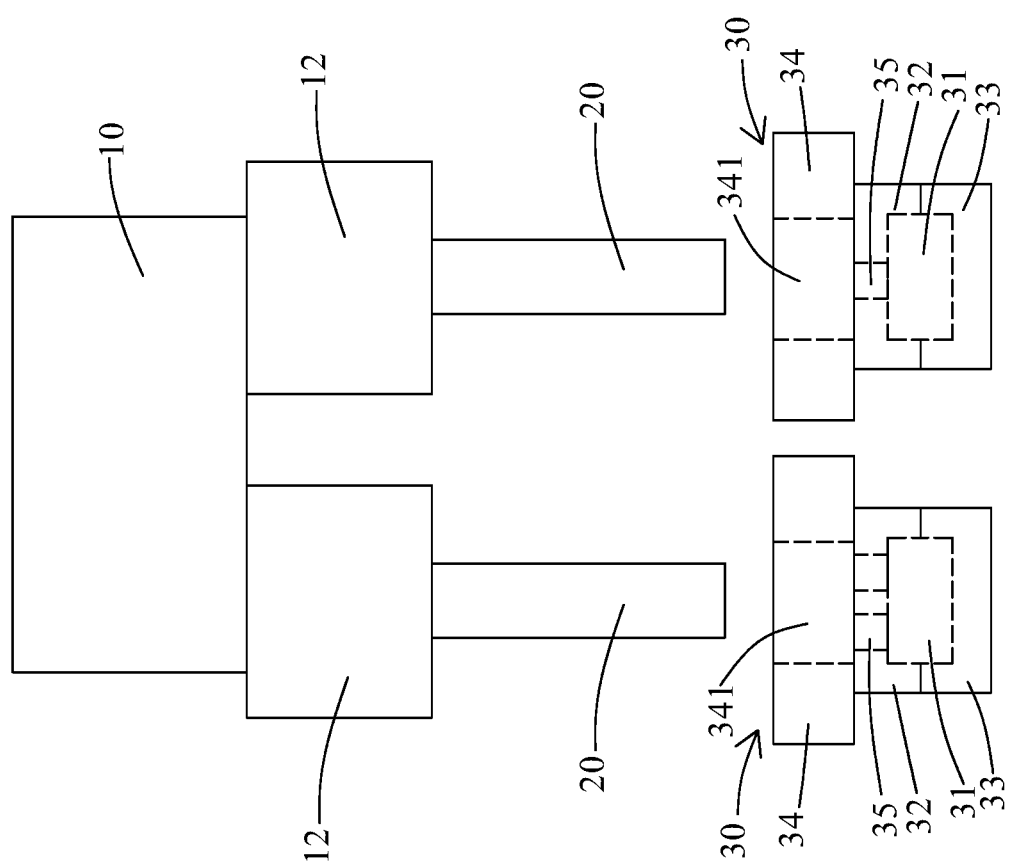

In some embodiments as shown in FIG. 1D, one extruding system 10 correspond to more than one injection outlet 12, and more than one injection outlets 12 correspond to several discharging channels 20. In other words, one extruding system 10 is connected to or communicable with more than one injection outlet 12, and more than one injection outlet 12 are connected to or communicable with several discharging channels 20. FIG. 1D illustrates two injection outlets 12 for clarity and simplicity, but such example is intended to be illustrative only, and is not intended to be limited to the embodiments. A person ordinarily skilled in the art would readily understand that suitable number of the injection outlets 20 can be utilized, and all such combinations are fully intended to be included within the scope of the embodiments.

Figure 1E:
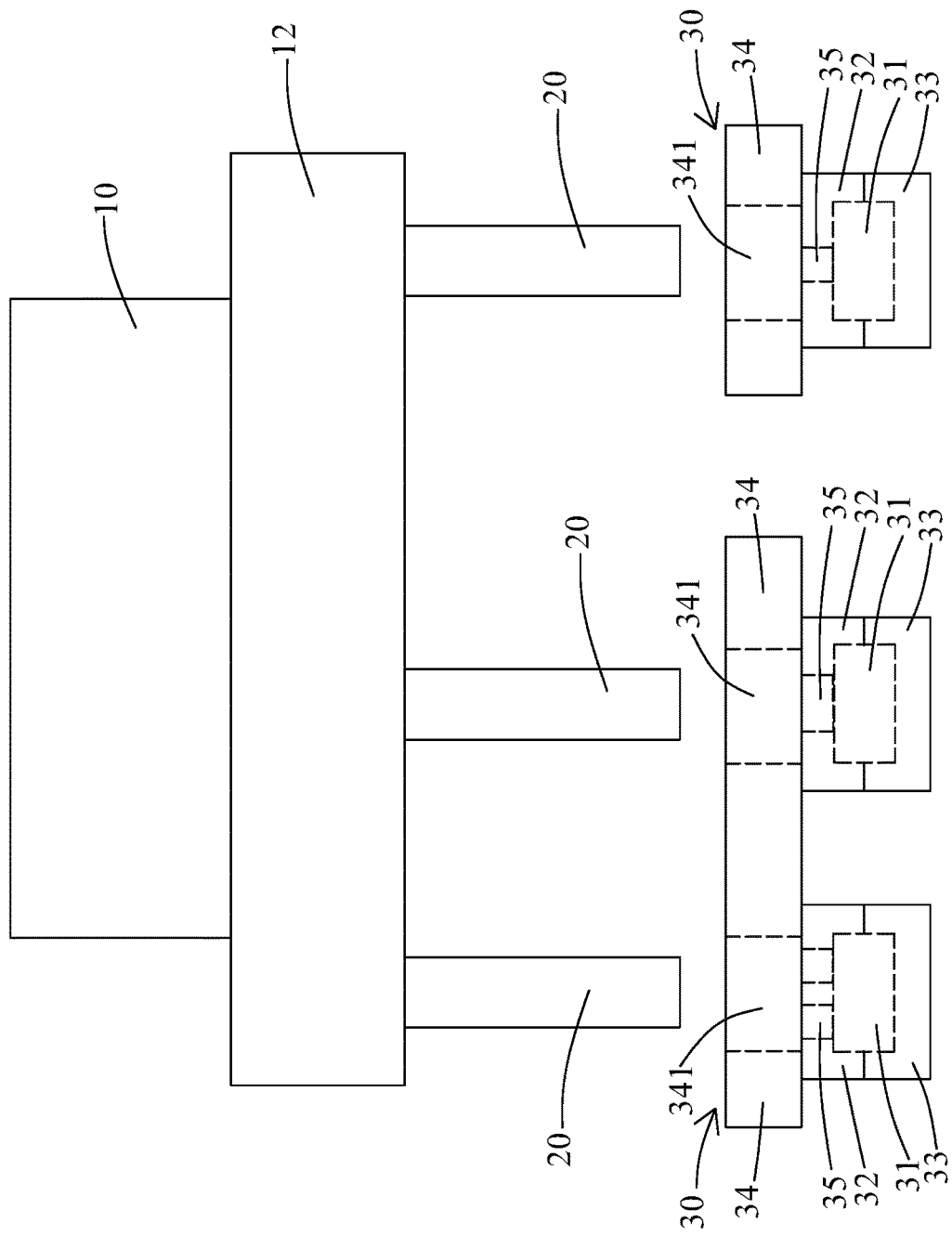

In some embodiments as shown in FIG. 1E, each molding device 30 includes more than one mold. In some embodiments, the molding device 30 includes one upper mold base 34 and several molds under the upper mold base 34. In some embodiments, one molding device 30 corresponds to more than one discharging channel 20. FIG. 1E illustrates the molding device 30 including two molds for clarity and simplicity, but such example is intended to be illustrative only, and is not intended to be limited to the embodiments. A person ordinarily skilled in the art would readily understand that suitable number of the molds can be utilized, and all such combinations are fully intended to be included within the scope of the embodiments.

In some embodiment, each mold receives the mixture at the same or different time. For example, the discharging channels 20 (on the left and right in FIG. 1E) are closed by a valve or the like and thus no mixture would be flowed into the hollow spaces 31 of the molds (on the left and right in FIG. 1E) upon flowing of the mixture from another discharging channel 20 (at the middle in FIG. 1E) into the hollow space 31 of another mold (at the middle in FIG. 1E).

Figure 1F:
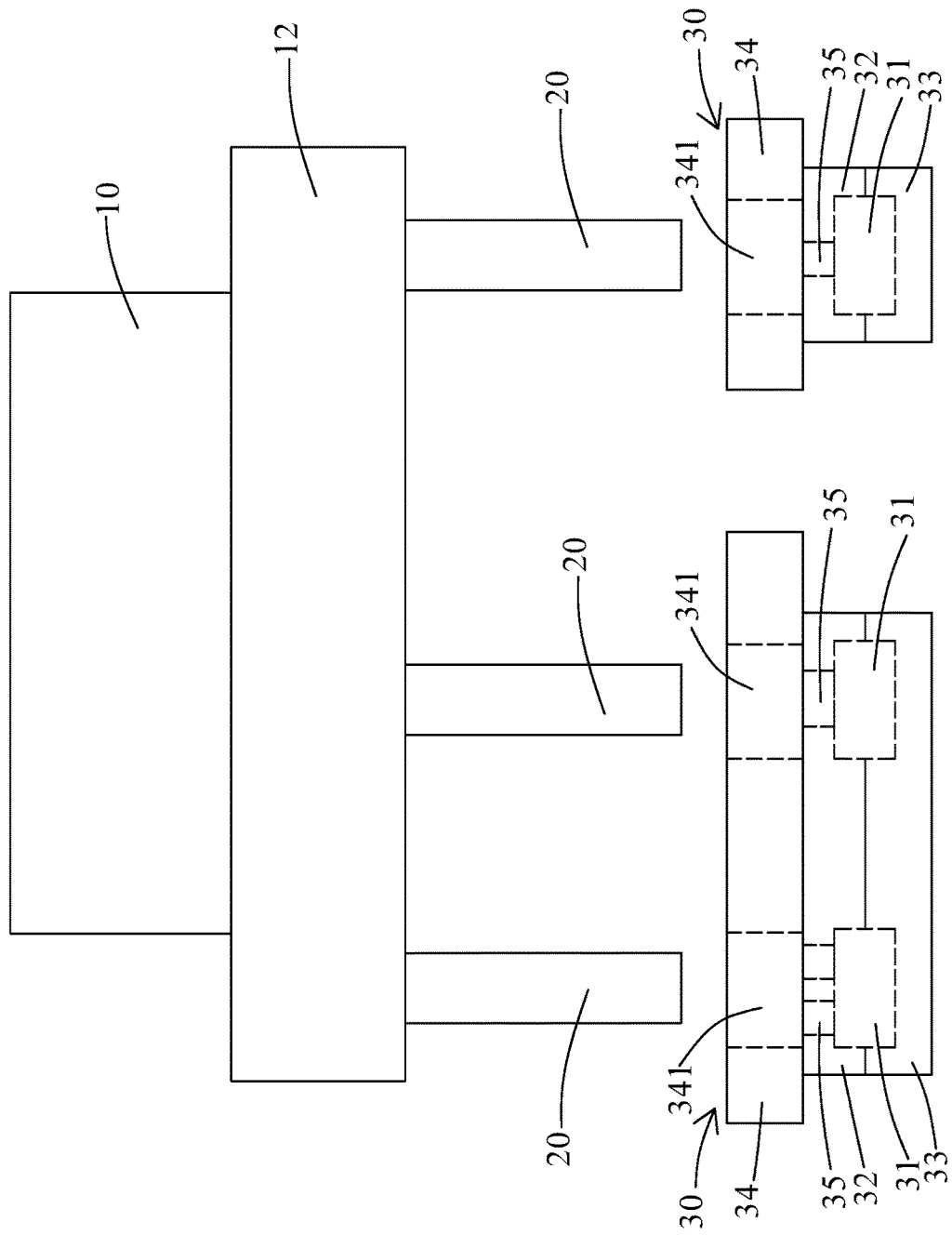

In some embodiments as shown in FIG. 1F, each mold includes more than one hollow space 31. In some embodiments, the hollow spaces 31 of the mold are isolated from each other and are not communicable with each other. FIG. 1F illustrates the mold includes two hollow spaces 31 for clarity and simplicity, but such example is intended to be illustrative only, and is not intended to be limited to the embodiments. A person ordinarily skilled in the art would readily understand that suitable number of the hollow spaces 31 can be utilized, and all such combinations are fully intended to be included within the scope of the embodiments.

In some embodiments, hollow spaces 31 of the mold have same or different volumes from each other. For example, a volume of the hollow space 31 (on the left in FIG. 1F) of the mold is greater than a volume of another hollow space 31 (at the middle in FIG. 1F) of the mold. In some embodiments, each hollow space 31 may receive the mixture in same or different amount. For example, the hollow space 31 (on the left in FIG. 1F) receives larger amount of the mixture than another hollow space 31 (at the middle in FIG. 1F). In some embodiment, each hollow space 31 may receive the mixture at the same or different time. For example, the discharging channels 20 (on the left and right in FIG. 1F) are closed by a valve or the like and thus no mixture would be flowed into the hollow spaces 31 (on the left and right in FIG. 1F) of the molds upon flowing of the mixture from another discharging channel 20 (at the middle) into the another hollow space 31 (at the middle) of the mold.

Figure 1G:
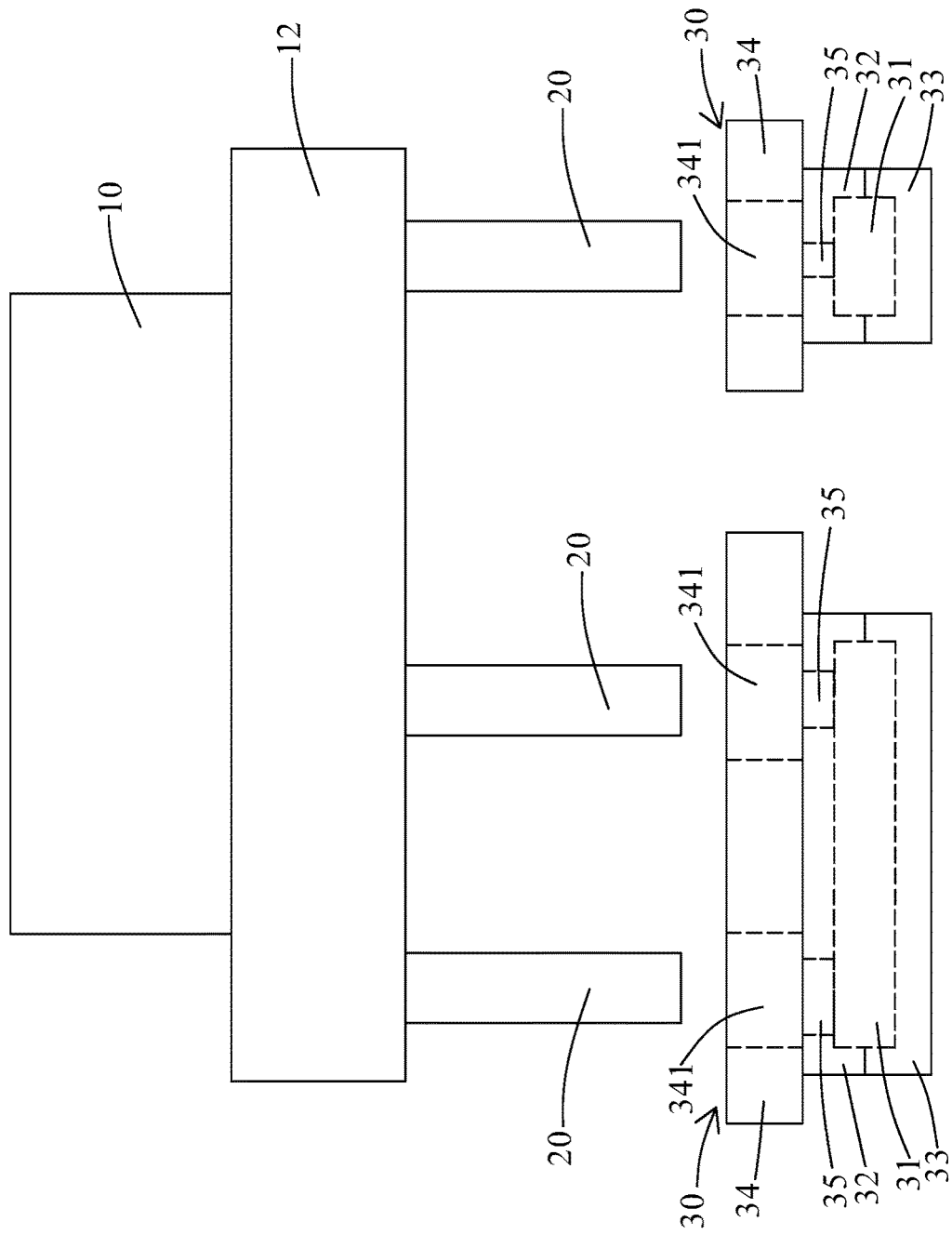

In some embodiments as shown in FIG. 1G, more than one discharging channel 20 is communicable with the one hollow space 31 of the mold. In some embodiments, each of the discharging channels 20 can discharge the same or different amounts of the mixture. In some embodiments, the discharging channels 20 have widths or diameters same as or different from each other. In some embodiments, the discharging channels have same or different flow rates from each other. FIG. 1G illustrates the mixture can be injected into one hollow space 31 of the mold through two discharging channels 20 for clarity and simplicity, but such example is intended to be illustrative only, and is not intended to be limited to the embodiments. A person ordinarily skilled in the art would readily understand that suitable number of the discharging channels 20 can be utilized, and all such combinations are fully intended to be included within the scope of the embodiments.

In some embodiment, each hollow space 31 may receive the mixture at the same or different time. For example, the discharging channels 20 (on the left and right in FIG. 1G) are closed by a valve or the like and thus no mixture would be flowed into the hollow spaces 31 of the molds (on the left and right in FIG. 1G) from the discharging channels 20 (on the left and right in FIG. 1G) upon flowing of the mixture from another discharging channel 20 (at the middle in FIG. 1G) into the hollow space 31 of the mold (on the left in FIG. 1G).

FIG. 2 is a schematic diagram of a portion of an injection-molding system 100 according to one embodiment of the present invention. In some embodiments, the molding device 30 further includes a venting unit 38 configured to adjust the pressure in the hollow space 31. In some embodiments, after the mixture is injected into the hollow space 31, the pressure in the mold cavity is increased, and the venting unit 38 may vent some gas to ensure that the hollow space 31 is kept within a suitable pressure range. In some embodiments, the venting unit 38 is configured to adjust or reduce the pressure in the hollow space 31.

In some embodiments, the venting unit 38 is disposed at the inner wall of the upper mold 32 or the lower mold 33. In some embodiments, the feeding port 35 and the venting unit 38 are disposed oppositely with respect to the hollow space 31; as an example but not limitation, the feeding port 35 is disposed at the inner top wall of the upper mold 32, and the venting unit 38 is disposed at the inner bottom wall of the lower mold 33. In some embodiments, the feeding ports 35 are disposed at the inner top wall of the upper mold 32, and the venting unit 38 is disposed at the inner sidewall of the lower mold 33. In some embodiments, the feeding port 35 is disposed at the inner sidewall of the upper mold 32, and the venting unit 38 is disposed at the inner sidewall of the lower mold 33 and is located at another side opposite to the feeding port 35. In some embodiments, the feeding port 35 is away from the venting unit 38. In some embodiments, the feeding port 35 is disposed at the inner sidewall or the inner top wall of the upper mold 32, and the pressure-regulating system 36 and the venting unit 38 are disposed at the two opposite inner sidewalls of the lower mold 33.

In some embodiments, the venting unit 38 includes a gas conduit 381 and a shutter 382 configured to allow the gas to flow into the gas conduit 381 and avoid the overflow of the mixture into the gas conduit 381 at the same time. The shutter 382 may control the amount of gas that enters the gas conduit 381 from the hollow space 31. In some embodiments, the venting unit 38 further includes a valve 383. One end of the gas conduit 381 is coupled to the hollow space 31, and the other end of the gas conduit 381 is in communication with the space with a pressure lower than the pressure in the hollow space 31, such as an external environment or a negative pressure space. When the valve 383 is closed, the gas stays in the hollow space 31, when the valve 383 is opened, the gas may enter the gas conduit 381 and pass through the valve 383. In some embodiments, the venting unit 38 includes a plurality of gas conduits 381, and the gas conduits 381 are coupled to the same valve 383. The location and number of the venting units 38 are not particularly limited, and may be adjusted depending on the needs. In some embodiments, each of the molding devices 30 may include a different number of the venting units 38 or no venting unit 38. In some embodiments, the control system 60 controls the venting unit 38 in real time.

Figure 3:
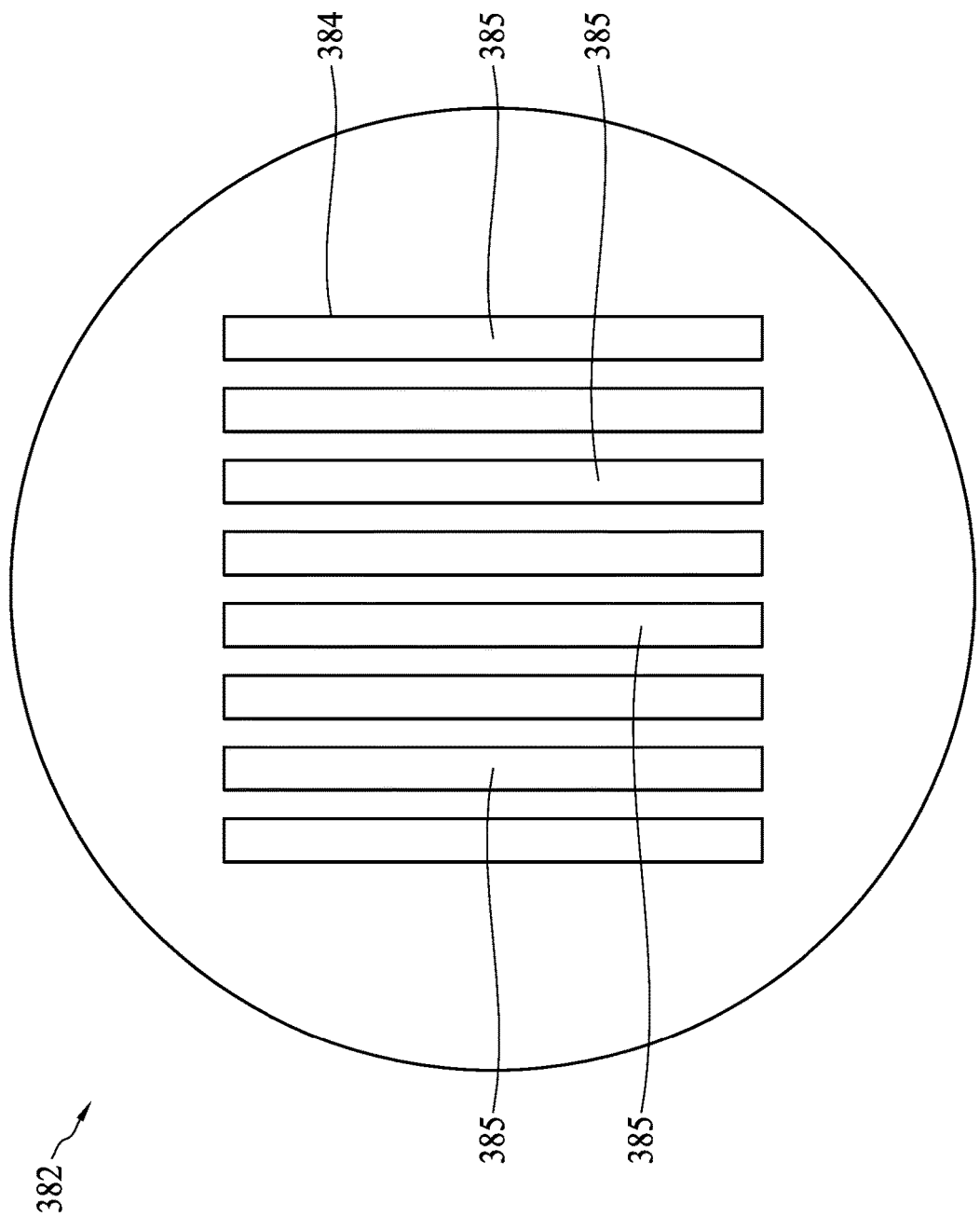
FIG. 3 is a schematic diagram of a portion of the injection-molding system in FIG. 2 according to one embodiment of the present invention.
Figure 4:
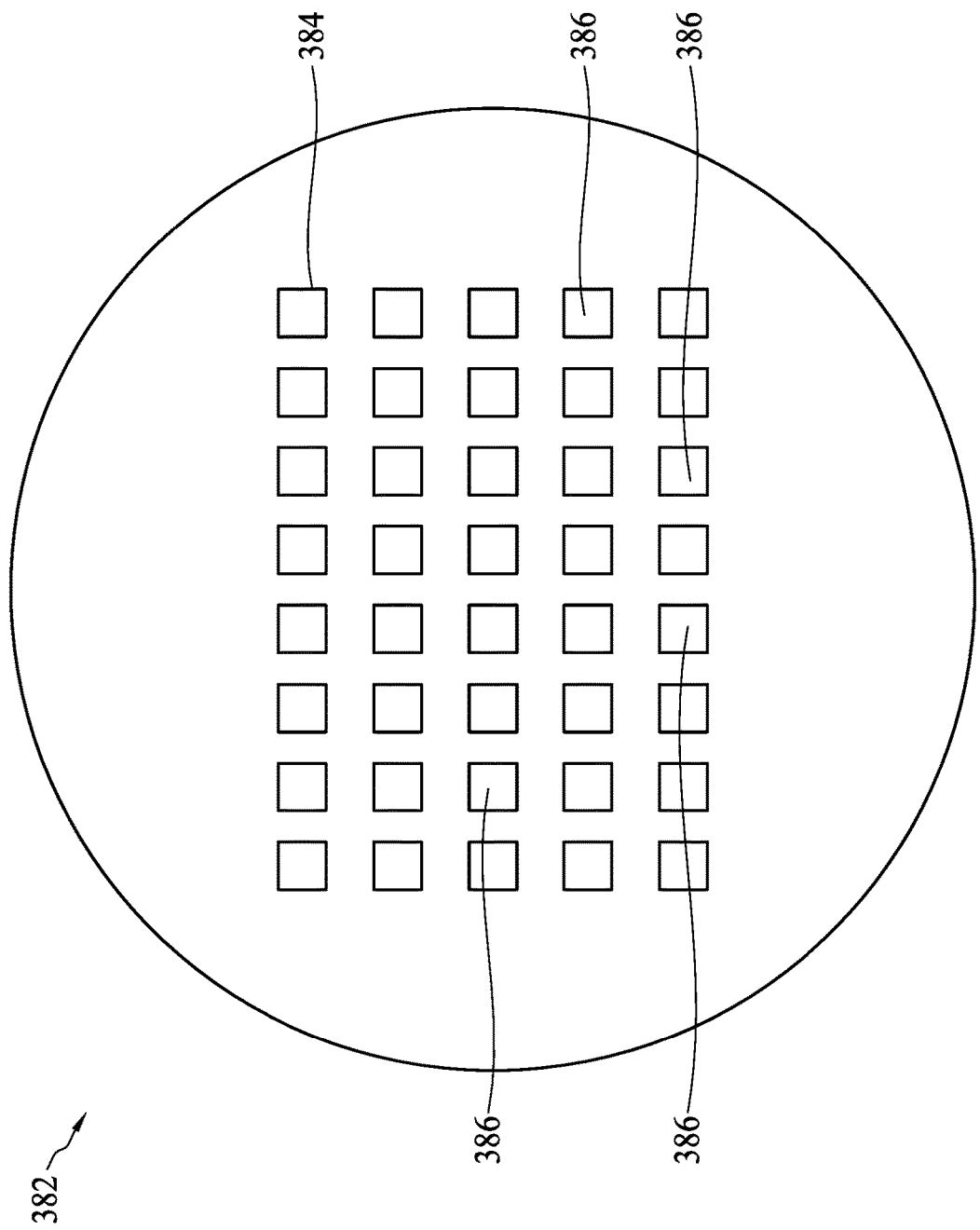
FIG. 4 is a schematic diagram of a portion of the injection-molding system FIG. 2 according to one embodiment of the present invention.

FIG. 3 and FIG. 4 are schematic diagrams of a portion of an injection-molding system 100 according to one embodiment of the present invention. Referring to FIG. 3, the shutter 382 may include a filter 384 to allow gas to enter into the gas conduit 381. The pore size of the filter 384 may be adjusted according to the needs as long as the gas may pass through the filter 384 and the mixture or the foamed polymeric article may not pass through the filter 384.

In some embodiments, the filter 384 has a plurality of slits 385 as shown in FIG. 3, and marks may be formed on the foamed polymeric article corresponding to the slits 385. The size and shape of the slits 385 may be similar or different. In some embodiments, the filter 384 has a plurality of pores 386 as shown in FIG. 4, and marks may be formed on the foamed polymeric article corresponding to the pores 386. The size and shape of the pores 386 may be similar or different. In some embodiments, the marks may be protrusions.

In some embodiments, the molding devices 30a, 30b are arranged in a line, a row, a column, an arc, a curve or any other suitable arrangements. In some embodiments, one of the molding devices 30a, 30b is adjacent to another one of the molding devices 30a, 30b. In some embodiments, the mixture is injected from the extruding system 10 into the molding devices 30a, 30b in a sequence. In some embodiments, the extruding system 10 and the discharging channels 20 are disposed over one of the plurality of molding devices 30a, 30b.

In some embodiments, the discharging channels 20 are movable relative to each of the plurality of molding devices 30a, 30b. In some embodiments, the molding devices 30a, 30b are stationary. In some embodiments, each of the plurality of molding devices 30a, 30b is movable relative to the extruding system 10 and the discharging channels 20. In some embodiments, the extruding system 10 and the discharging channels 20 are stationary.

Figure 5:
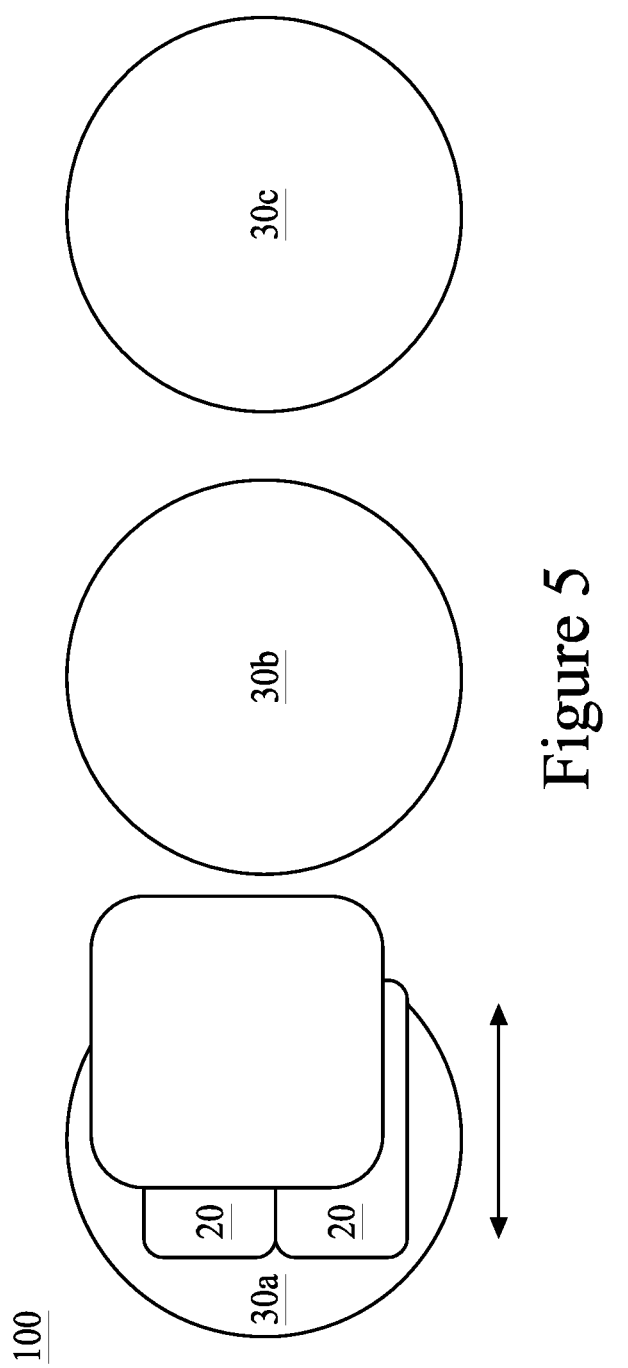
FIG. 5 is a top view of an injection-molding system according to one embodiment of the present invention.
Figure 6:
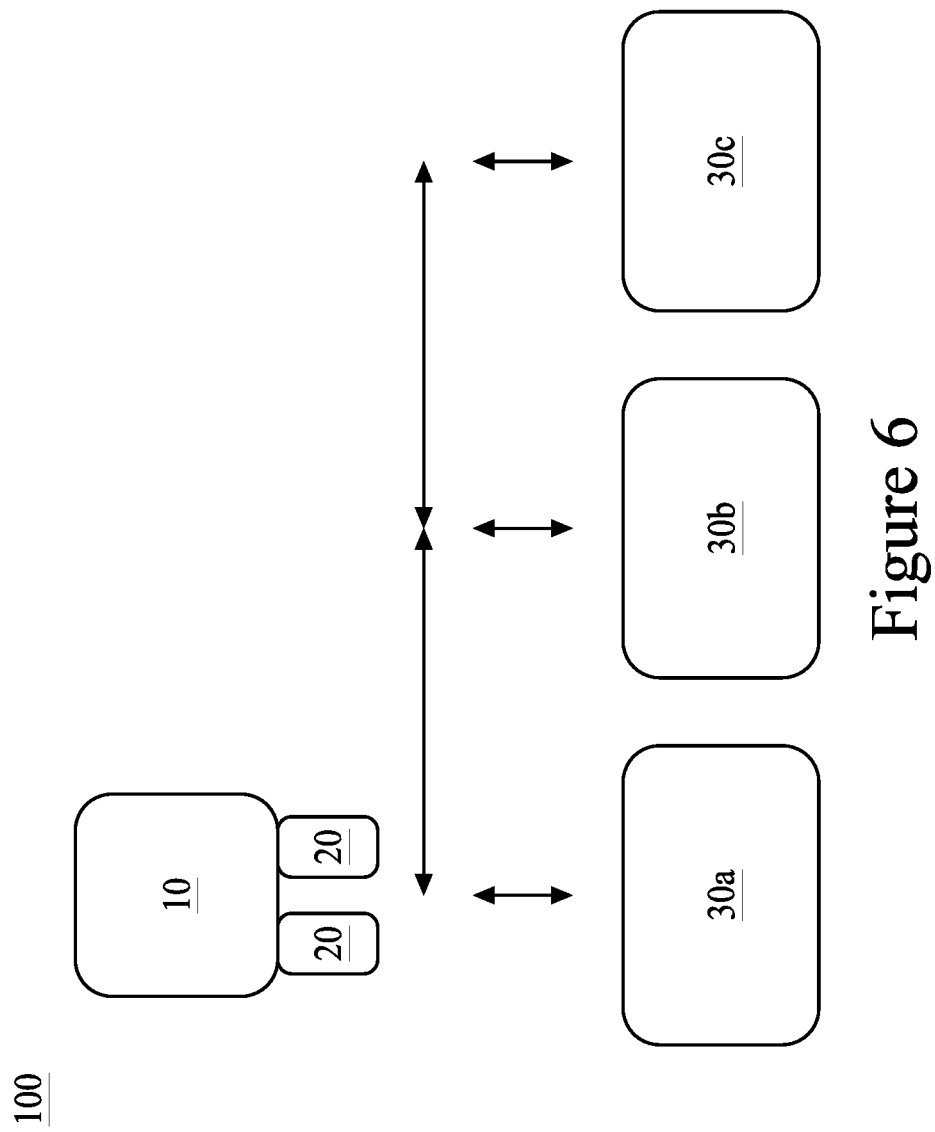
FIG. 6 is a schematic diagram of an injection-molding system according to one embodiment of the present invention.

FIG. 5 is a top view of an injection-molding system 100 according to one embodiment of the present invention. FIG. 6 is a schematic view of an injection-molding system 100 according to one embodiment of the present invention. In some embodiments, referring to FIG. 5 and FIG. 6, three molding devices 30a, 30b, 30c are arranged in a row. The extruding system 10 and the discharging channels 20 may move according to the arrangement of the molding devices 30a, 30b, 30c, and the mixture is injected from the extruding system 10 into the molding devices 30a, 30b, 30c in a sequence.

In some embodiments, the discharging channels 20 are linearly movable. In some embodiments, the discharging channels 20 move along the row, and then stop above one of the molding devices 30a and align with the corresponding molding device 30a. After the alignment, the discharging channels 20 move toward the molding device 30a, such that the discharging channels 20 engage with the molding device 30a. In some embodiments, the discharging channels 20 are engaged with the openings 341 of the upper mold base 34 respectively. After the engagement, the mixture is injected from the discharging channels 20 into the molding device 30a. After the injection, the discharging channels 20 withdraw from the molding device 30a, and then the extruding system 10 and the discharging channels 20 move toward the next molding device 30b.

Figure 7:
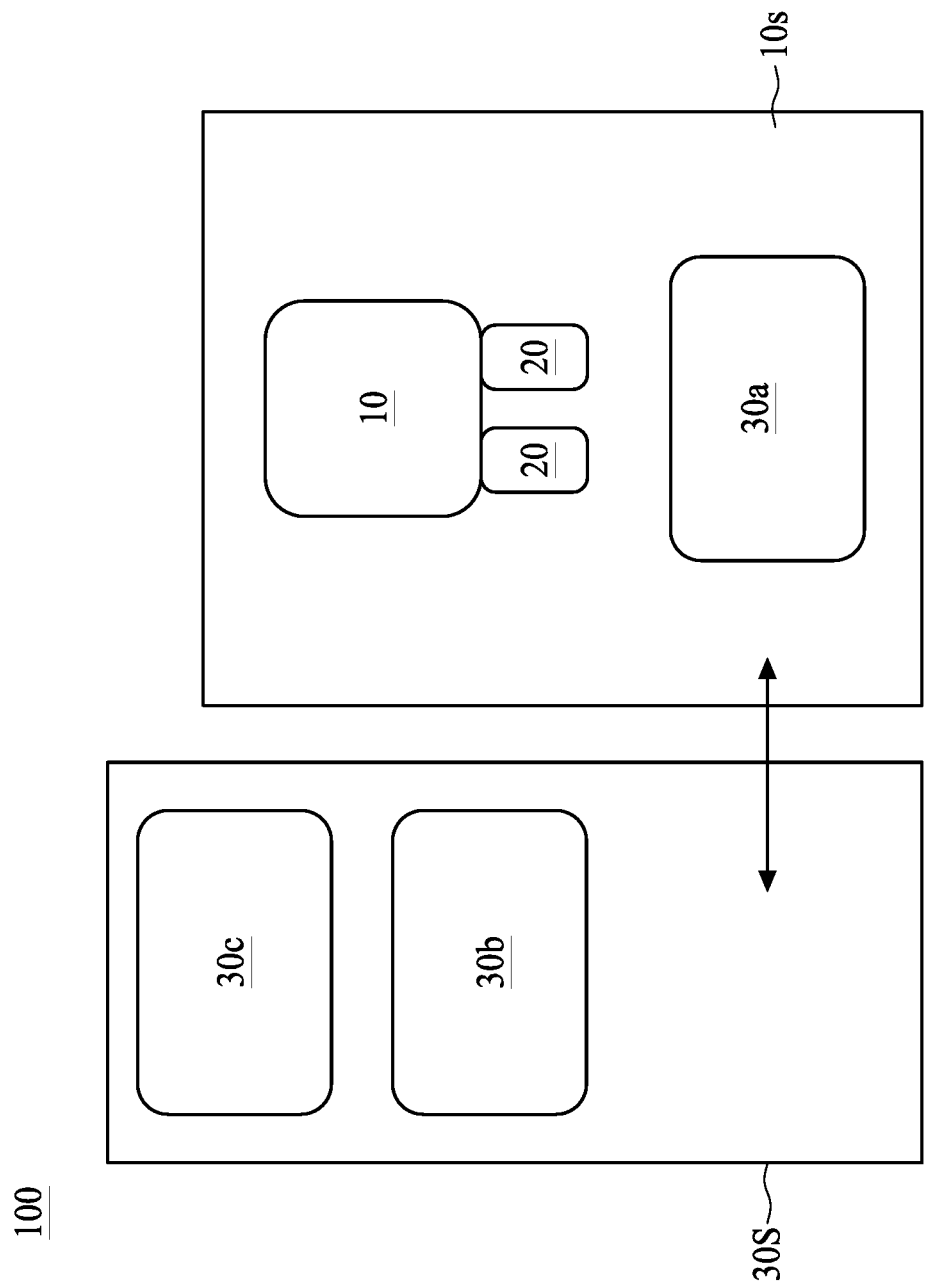
FIG. 7 is a schematic diagram of an injection-molding system according to one embodiment of the present invention.

FIG. 7 is a schematic view of an injection-molding system 100 according to one embodiment of the present invention. In some embodiments, the molding devices 30b, 30c are stacked. In some embodiments, the molding devices 30a, 30b, 30c are arranged in a stack at a molding station 30S, and the extruding system 10 and the discharging channels 20 are disposed at an extruding station 10S. Each molding device 30a, 30b, 30c can be moved out of the stack from the molding station 30S and slid into the extruding station 10S to align with the extruding system 10 and the discharging channels 20.

In some embodiments, the molding device 30a moves out of the molding station 30S and aligns with the discharging channels 20, while the other molding devices 30b, 30c are still stacked in the molding station 30S. After the mixture is injected into the molding device 30a at the extruding station 10S, the molding device 30a moves back to the molding station 30S for cooling. In some embodiments, the molding device 30a moves back to stack with the other molding devices 30b, 30c. In some embodiments, another one of the molding devices 30b, 30c moves out of the stack and aligns with the extruding station 10S after the molding device 30a leaves the extruding station 10S. The molding device 30a may move back to the molding station 30S for cooling. The order of the molding devices 30a, 30b, 30c moving out of the molding station 30S is not limited and can be performed manually or automatically. In some embodiments, the order of the moving of the molding devices 30a, 30b, 30c out of the molding station 30S is performed in a predetermined sequence.

In some embodiments, the molding devices 30 are arranged in an arc, and the discharging channels 20 are disposed at a center of the arc and are rotatable about the center. The discharging channels 20 are rotated to align with one of the molding devices 30a, 30b, 30c at a time, such that the mixture is injected from the discharging channels 20 into each of the molding devices 30a, 30b, 30c one by one. The discharging channels 20 can be moved along the arc and inject the mixture into the molding devices 30a, 30b, 30c in a sequence.

Figure 8:
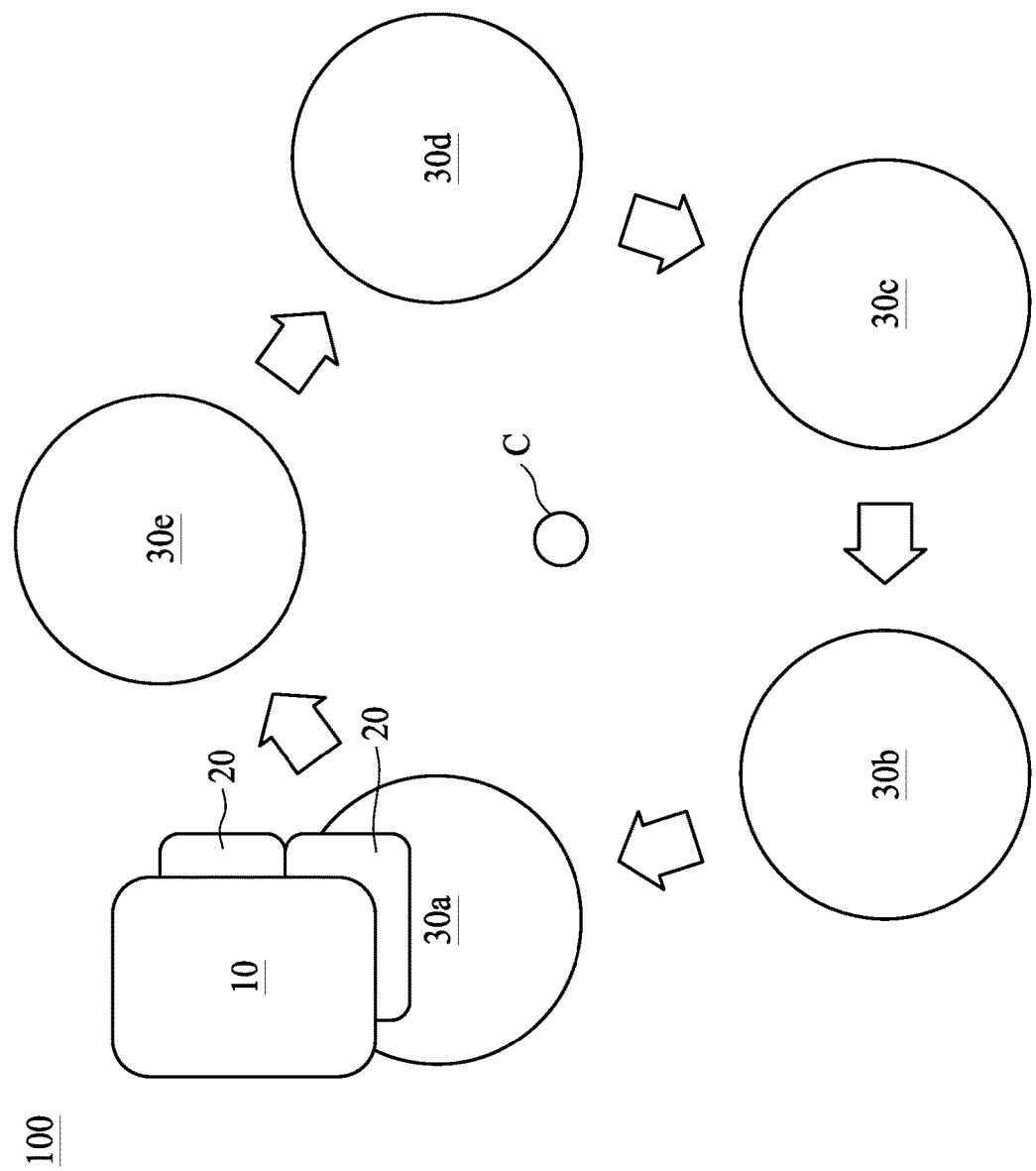
FIG. 8 is a top view of an injection-molding system according to one embodiment of the present invention.

FIG. 8 is a top view of an injection-molding system 100 according to one embodiment of the present invention. In some embodiments, the molding devices 30a, 30b, 30c, 30d, 30e are arranged in an annular shape. The molding devices 30a, 30b, 30c, 30d, 30e are axially rotatable about a center C, such that the molding devices 30a, 30b, 30c, 30d, 30e can be rotated about the central axis C. In some embodiments, the extruding system 10 and the discharging channels 20 are fixed at a predetermined position, and each of the molding devices 30a, 30b, 30c, 30d, 30e can pass under the extruding system 10 and the discharging channels 20 upon the rotation of the molding devices 30a, 30b, 30c, 30d, 30e about the central axis C. In some embodiments, the molding devices 30a, 30b, 30c, 30d, 30e are axially rotated about the central axis C, and each of the molding devices 30a, 30b, 30c, 30d, 30e stops under and aligns with the discharging channels 20 in a predetermined sequence. After the alignment, the mixture can be injected from the discharging channels 20 into one of the molding devices 30a, 30b, 30c, 30d, 30e under the discharging channels 20.

Figure 9:
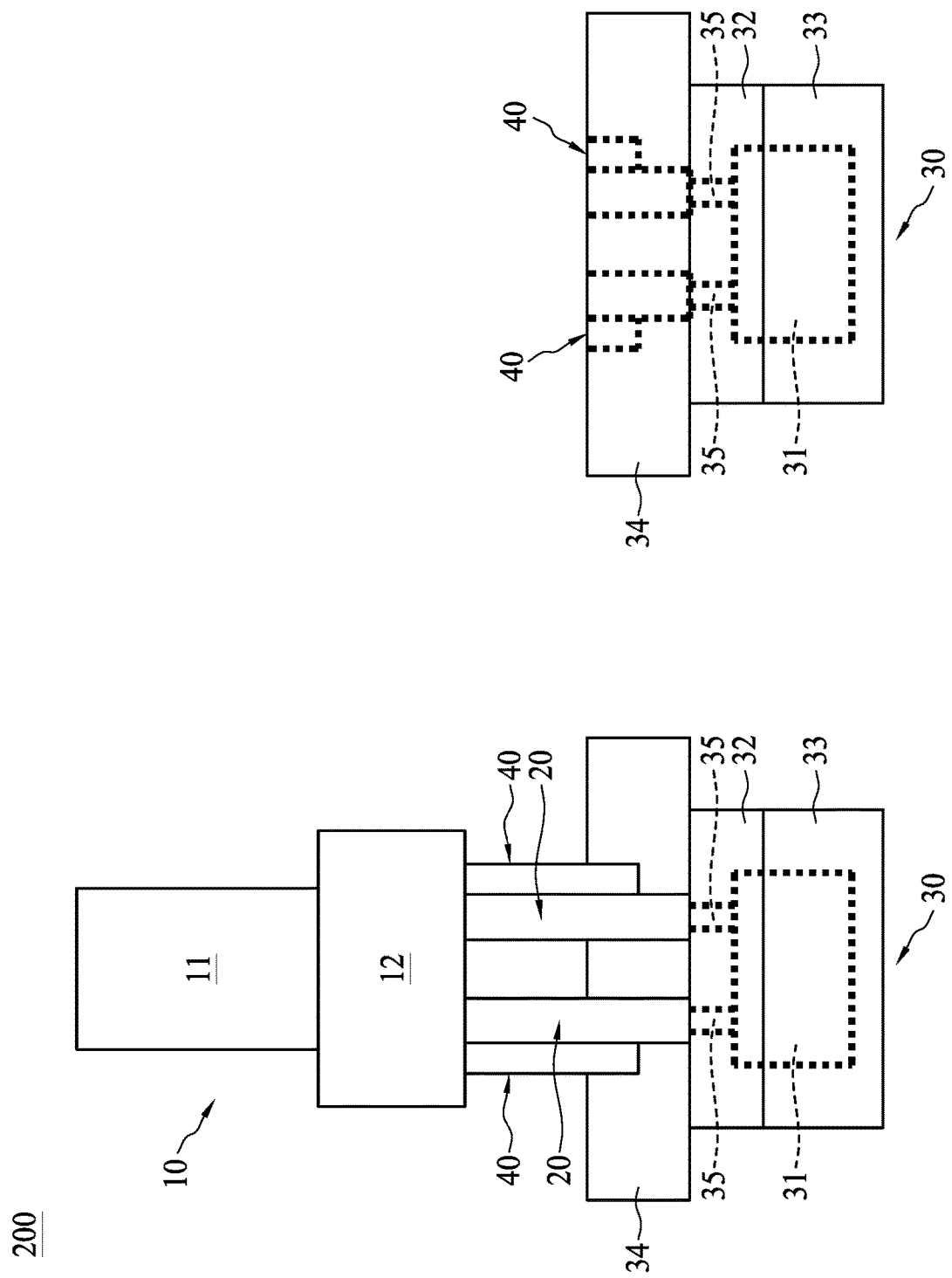
FIG. 9 is a schematic diagram of an injection-molding system according to one embodiment of the present invention.

FIG. 9 is schematic diagrams of an injection-molding system 200 according to one embodiment of the present invention. In some embodiments, referring to FIG. 9, the injection-molding system 200 further includes a supporting unit 40 configured to facilitate an engagement of the discharging channels 20 to each of the plurality of molding devices 30. The supporting unit 40 can be disposed at any suitable position on the injection-molding system 200. In some embodiments, the supporting unit 40 is configured to support the discharging channel 20. In some embodiments, the supporting unit 40 is used to prevent separation of the discharging channels 20 and the molding device 30 during the injection of the mixture. In some embodiments, the control system 60 controls the supporting unit 40 in real time.

Figure 10:
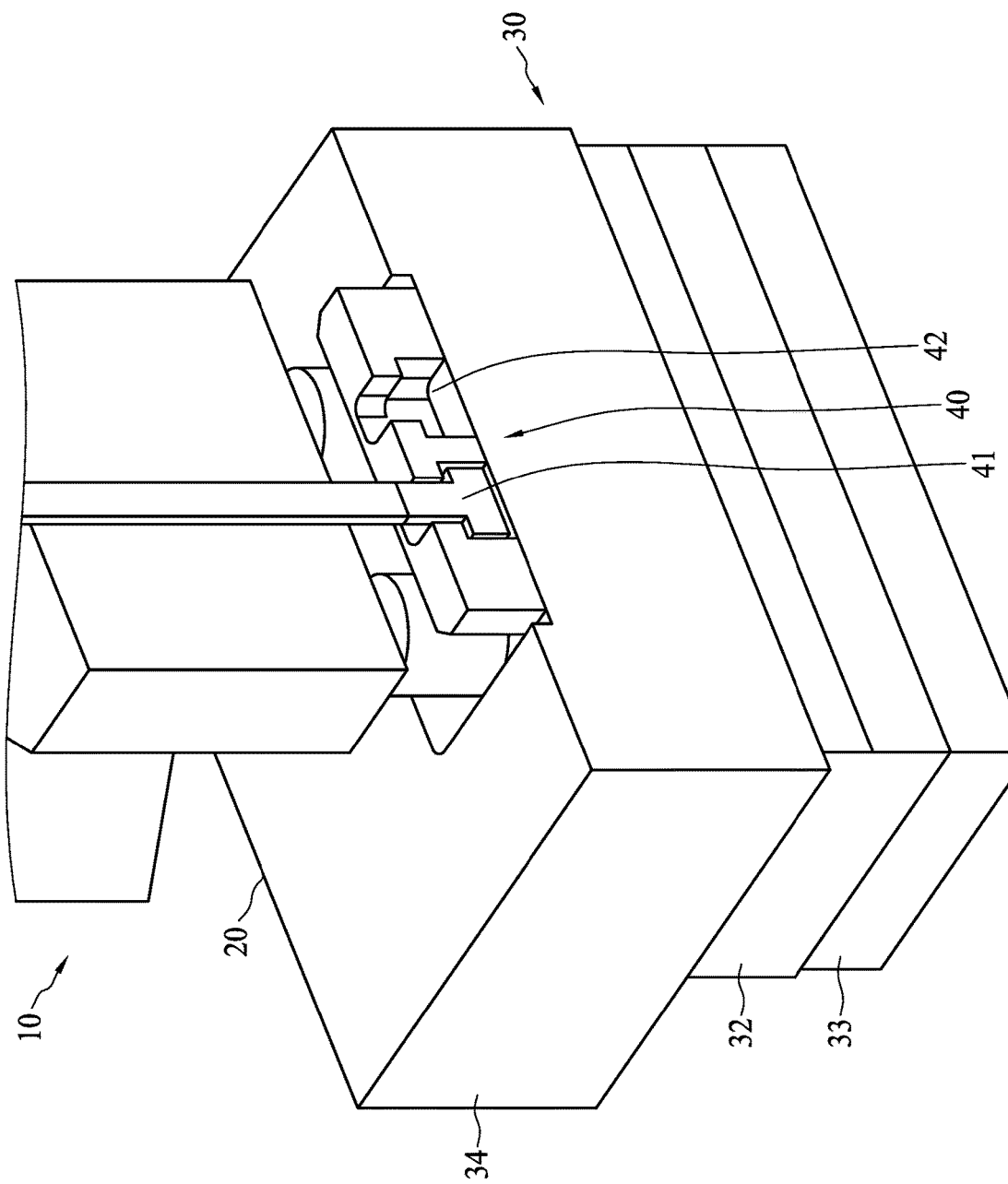
FIG. 10 is a schematic diagram of a portion of the injection-molding system in FIG. 9 according to one embodiment of the present invention.

FIG. 10 is a schematic diagram of a portion of the injection-molding system 200 according to one embodiment of the present invention. In some embodiments, referring to FIG. 10, the supporting device 40 includes first and second elements 41, 42 configured to engage with each other, wherein the first element 41 protrudes from the extruding system 10 or the discharging channel 20, and the second element 42 is disposed on each of the plurality of molding devices 30, but the disclosure is not limited thereto. In some embodiments, the first and second elements, 41, 42 can be clamped to each other; for example, the second element 42 is configured to receive the first element 41. In some embodiments, the first element 41 is disposed on the discharging channel 20, and the second element 42 is disposed on each molding device 30. In some embodiments, the second element 42 is disposed on the upper mold base 34 of the molding device 30. In some embodiments, the first element 41 is a part of the extruding system 10 or the discharging channel 20, while the second element 42 is a part of the molding device 30. In some embodiments, the first element 41 is a part of the extruding system 10 and disposed adjacent to the discharging channels 20, and the second element 42 is disposed above or facing toward the upper mold base 34 of the molding device 30. In some embodiments, the first element 41 and the second element 42 can engage with each other, thereby tightly engaging the discharging channels 20 with the upper mold base 34 of the molding device 30.

In some embodiments, in order to prevent separation of the extruding system 10 and the molding device 30 during the injection of the mixture, the engaged first element 41 is subjected to a force to against the second element 42. The force may be equal to or greater than a threshold. The threshold may be adjusted according to the pressure in the hollow space 31 and the diameter of the outlet 21, or according to other factors.

The position and number of the first element 41 may be adjusted according to requirements, and are not particularly limited. The position and number of the second element 42 may also be adjusted according to requirements, and are not particularly limited. In some embodiments, the position and number of the second element 42 correspond to the position and number of the first element 41. In an embodiment, the first element 41 can be disposed at any suitable position on the discharging channel 20, and the second element 42 can be disposed at any suitable position on the molding device 30. In some embodiments, the second element 42 is disposed above the upper mold 32.

Figure 11:
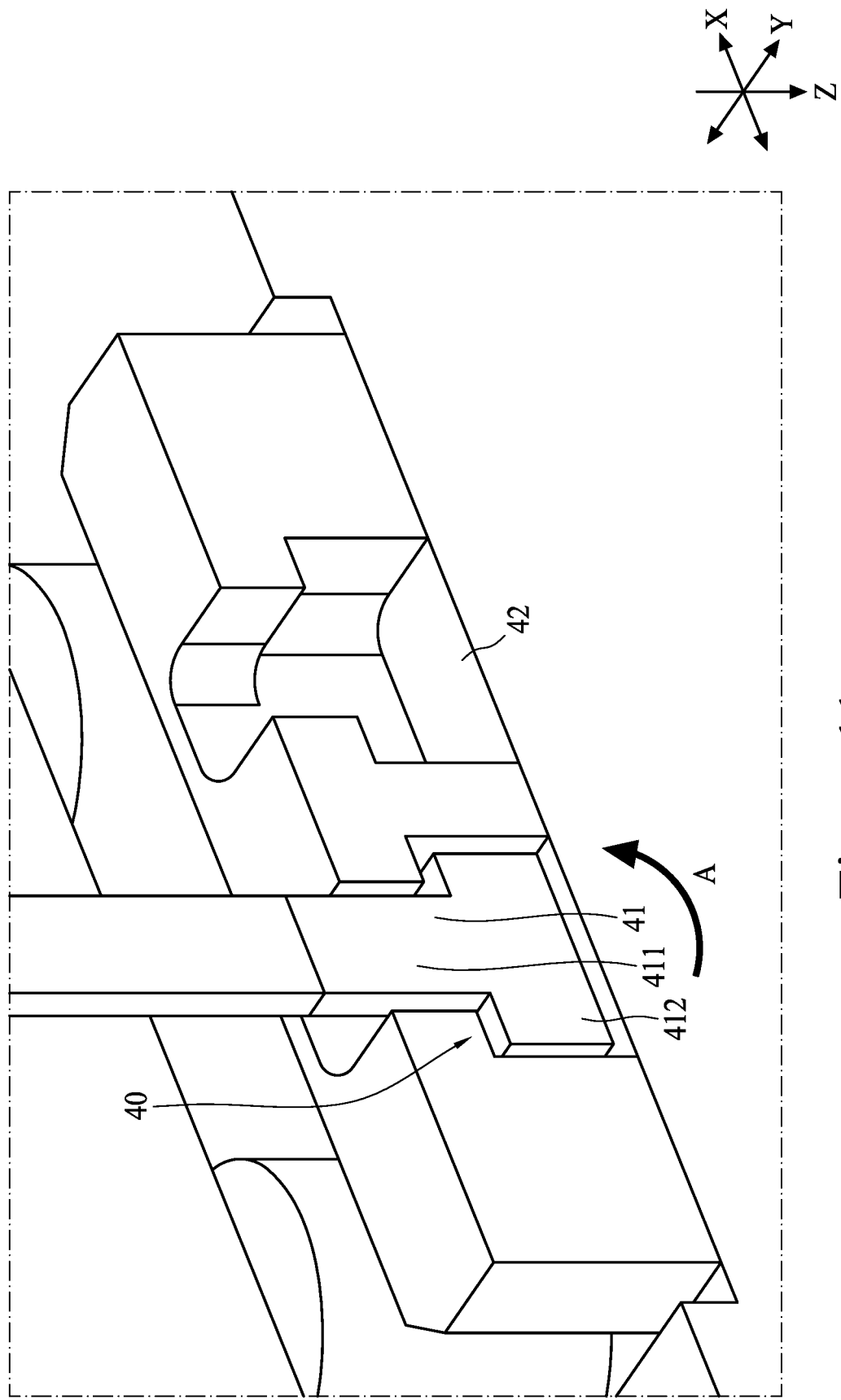
FIG. 11 is a schematic diagram of a portion of the injection-molding system in FIG. 9 according to one embodiment of the present invention.

FIG. 11 is a schematic diagram of a portion of the injection-molding system 200 according to one embodiment of the present invention. In some embodiments, referring to FIG. 11, the supporting unit 40 can be in either of two states, a locked state and an unlocked state. In the unlocked state, the first element 41 enters the corresponding second element 42 but has not yet been locked with the second element 42. In other words, the first element 41 can still be withdrawn from the second element 42 when the supporting unit 40 is in the unlocked state. In the locked state, the first element 41 enters and locks with the corresponding second element 42, such that the first element 41 cannot be withdrawn from the second element 42. FIG. 11 illustrates the supporting unit 40 in the locked state. The supporting unit 40 can be operated and controlled manually or automatically. The supporting unit 40 can be switched between two states manually or automatically.

In some embodiments, the first element 41 is rotatably fixed to the extruding system 10. In some embodiments, the first element 41 includes an elongated portion 411 and an arm portion 412. The elongated portion 411 and the arm portion 412 are rotatable in a direction indicated by an arrow A. The elongated portion 411 is fixed to the extruding system 10 and extends in a first direction Z toward the upper mold 32. The arm portion 412 is coupled to the elongated portion 411 and extends in a second direction X substantially orthogonal to the first direction Z or in a third direction Y substantially orthogonal to the first direction Z. In some embodiments, the first element 41 has an inverted T shape. After the first element 41 enters the second element 42, the supporting unit 40 is changed from the unlocked state to the locked state by rotation of the arm portion 412 of the first element 41. In some embodiments, the first element 41 is locked with the second element 42 by rotating the arm portion 412 of the first element 41 with about 90 degrees. FIG. 11 illustrates the arm portion 412 is locked with the second element 42 after rotating the arm portion 412 with about 90 degrees. As a result, the supporting unit 40 is in the locked state, and the discharging channel 20 is tightly engaged with the molding device 30, and thus the injection of the mixture from the extruding system 10 and the discharging channel 20 to the molding device 30 can begin.

Figure 12:
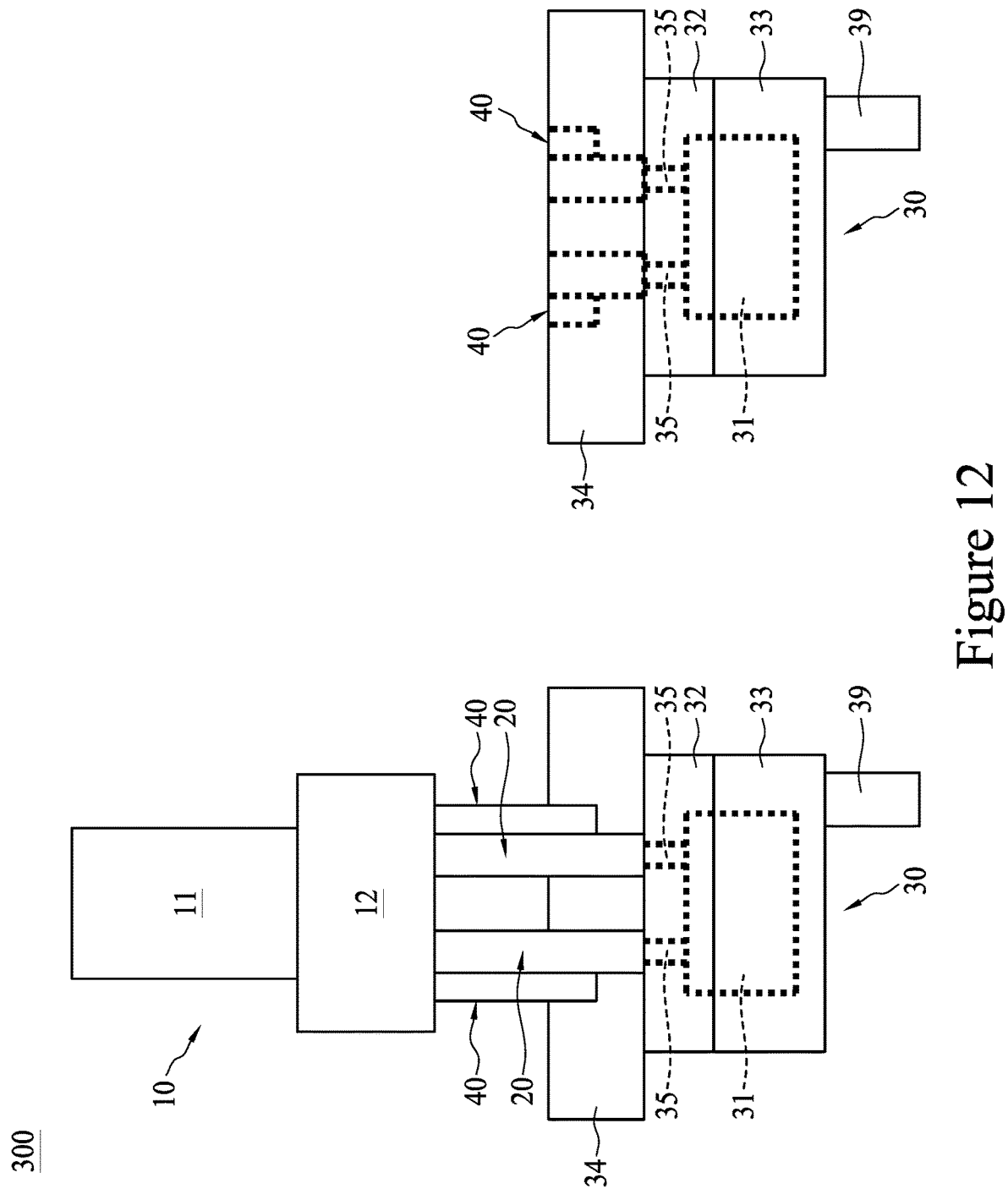
FIG. 12 is a schematic diagram of an injection-molding system according to one embodiment of the present invention.

Referring to FIG. 12, in some embodiments, the molding device 30 of an injection-molding system 300 further includes a sealing element 39 configured to tightly dock the upper mold 32 to the lower mold 33. In some embodiments, the sealing element 39 is disposed below the lower mold 32 and provides a force toward the discharging channels 20. In some embodiments, a first force toward the molding device 30 is generated during the injecting of the mixture, and the sealing element 39 provides a second force against the first force. In some embodiments, the sealing element 39 is disposed between the upper mold 32 and the lower mold 33. The seal ring may be disposed between the upper mold 32 and the lower mold 33, or between the upper mold base 34 and the upper mold 32. In some embodiments, the control system 60 controls the sealing element 39 in real time.

In some embodiments, the temperature of the discharging channel 20 is different from the temperature of the molding device 30. The temperature of the discharging channel 20 is greater than that of the molding device 30. In some embodiments, temperature of the discharging channel 20 ranges between 150° C. and 200° C., and temperature of the molding device 30 may range between 20° C. and 60° C.

Figure 13:
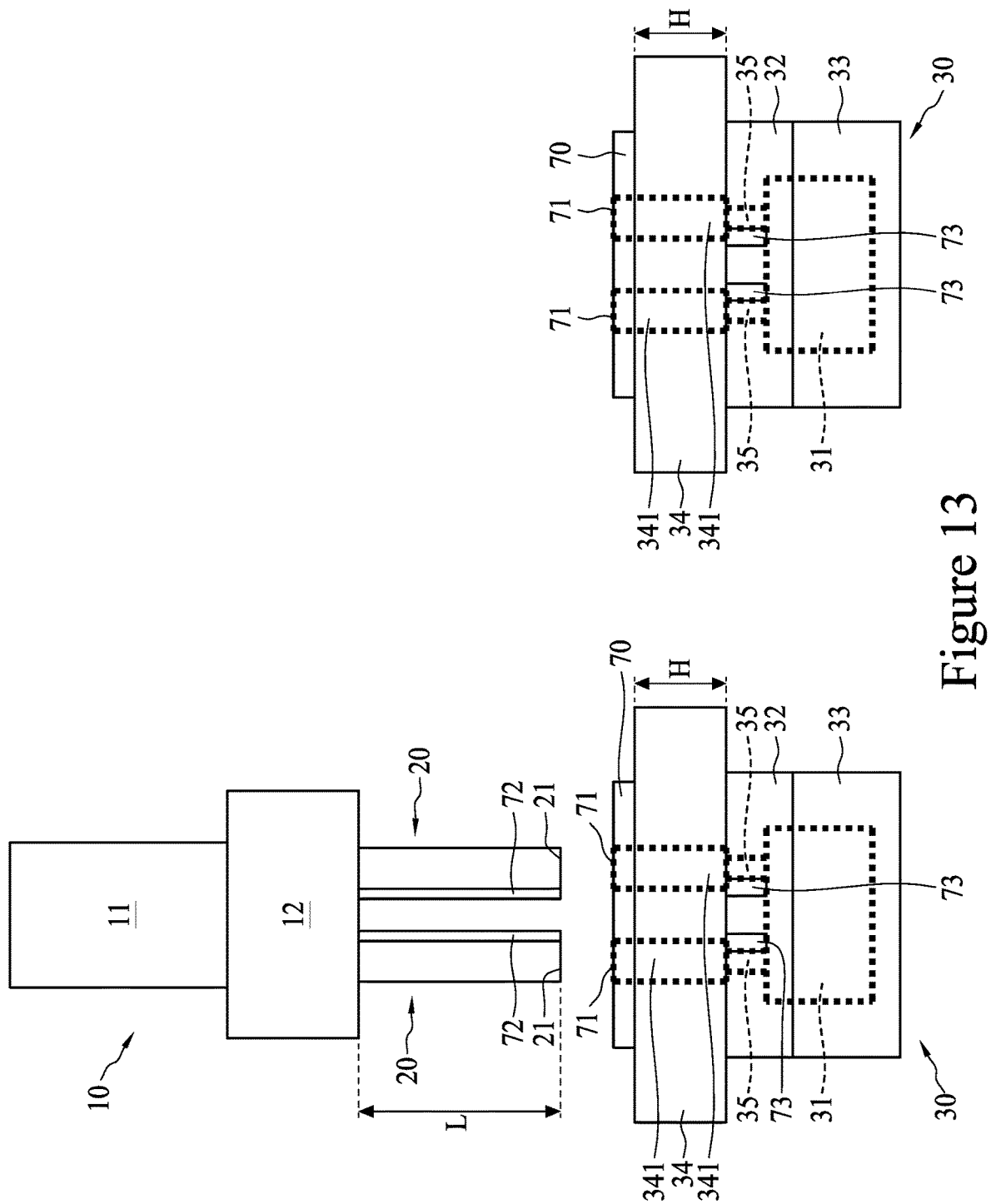
FIG. 13 is a schematic diagram of an injection-molding system according to one embodiment of the present invention.

FIG. 13 is a schematic diagram of an injection-molding system 400 according to one embodiment of the present invention. In some embodiments, referring to FIG. 13, in order to maintain the temperature difference between the discharging channels 20 and the molding devices 30, the injection-molding system 400 further includes an insulator 70 disposed between the discharging channels 20 and the molding devices 30. In some embodiments, the insulator 70 is disposed between the discharging channels 20 and the upper mold base 34. In some embodiments, the insulator 70 is disposed on the upper mold base 34. In some embodiments, the insulator 70 is disposed between the outlet 21 and the feeding port 35.

Each of the discharging channels 20 may extend into the insulator 70 and is thereby partially surrounded by the insulator 70. In some embodiments, the insulator 70 includes openings 71 configured to receive the corresponding discharging channels 20. The openings 71 of the insulator 70 are aligned to the openings 341 of the upper mold base 34. Each of the openings 71 extends through the insulator 70. The insulator 70 may be mounted on the upper mold base 34, such as by a screw. The insulator 70 may include a non-thermally conductive material, such as a fiber glass. The insulator 70 may be comprised entirely of non-metal materials. In some embodiments, the insulator 70 has a melting point substantially greater a temperature of the mixture flowing through the discharging channel 20. In some embodiments, the melting point of the insulator 70 is substantially greater than 180° C.

In some embodiments, a width of the insulator 70 is less than that of the upper mold base 34. The thickness of the insulator 70 may be related to several factors, such as properties of materials for making the molding device 30 and the discharging channels 20, temperatures of the discharging channels 20 and the upper mold base 34, or the like. In some embodiments, the thickness of the insulator 70 is less than the thickness H of the upper mold base 34.

In some embodiments, in order to maintain the temperature difference between the discharging channels 20 and the molding devices 30 and maintain the fluidity of the mixture, the discharging channels 20 further include a heater 72 configured to keep the temperature of the discharging channels 20 within a predetermined range. In some embodiments, each of the discharging channels 20 includes the heater 72 disposed thereon. In some embodiments, each of the discharging channels 20 includes the heater 72 disposed around the outlet 21. In some embodiments, the heaters 72 may enter the openings 71 and the openings 341 together with the corresponding discharging channels 20 when the discharging channels 20 are engaged with the molding device 30. The positions and number of the heaters 72 may be adjusted according to requirements, and are not particularly limited. Each of the discharging channels 20 may include a different number of heaters 72 or no heater 72. In some embodiments, the injection-molding system 400 includes the extruding system 10, the discharging channel 20, and a single molding device 30, wherein the discharging channel 20 includes the heater 72 configured to adjust the temperature of the discharging channel 20.

In some embodiments, in order to maintain the fluidity of the mixture, the molding device 30 further includes a heater 73 configured to maintain the temperature of the feeding port 35 within a predetermined range. In some embodiments, the heater 73 is disposed in the upper mold base 34 or the upper mold 32. In some embodiments, the heater 73 is disposed adjacent to the feeding port 35. The positions and number of the heaters 73 may be adjusted according to requirements, and are not particularly limited. In some embodiments, the feeding port 35 can be heated to a predetermined temperature (e.g. 200° C. or above) by the heater 73 during flowing of the mixture from the discharging channel 20 into the molding device 30, and then the feeding port 35 can be instantly cooled down to a predetermined temperature (e.g. 50° C. or lower) when the flowing of the mixture is accomplished. In some embodiments, the feeding port 35 is cooled down when the discharging channel 20 is withdrawn from the molding device 30. In some embodiments, such instant cooling can be implemented by turning off the heater 73 or turning on a cooling member disposed adjacent to the feeding port 35. Each of the molding devices 30 can include a different number of heaters 73 or no heater 73. In some embodiments, the injection-molding system includes the extruding system 10, the discharging channel 20, and a single molding device 30, wherein the molding device 30 includes the heater 73 configured to adjust the temperature of the feeding port 35.

In some embodiments, the control system 60 further electrically controls the insulator 70, the heaters 72 of the discharging channels 20 and the heaters 73 of the molding devices 30 in real time. In some embodiments, the control system 60 controls the discharging channels 20 to be connected to one of the molding devices 30, and controls the heaters 72 of the discharging channels 20 or the heater 73 of the molding device 30 to heat the discharging channel 20, the outlet 21 or the feeding port 35 to a predetermined temperature.

Figure 14:
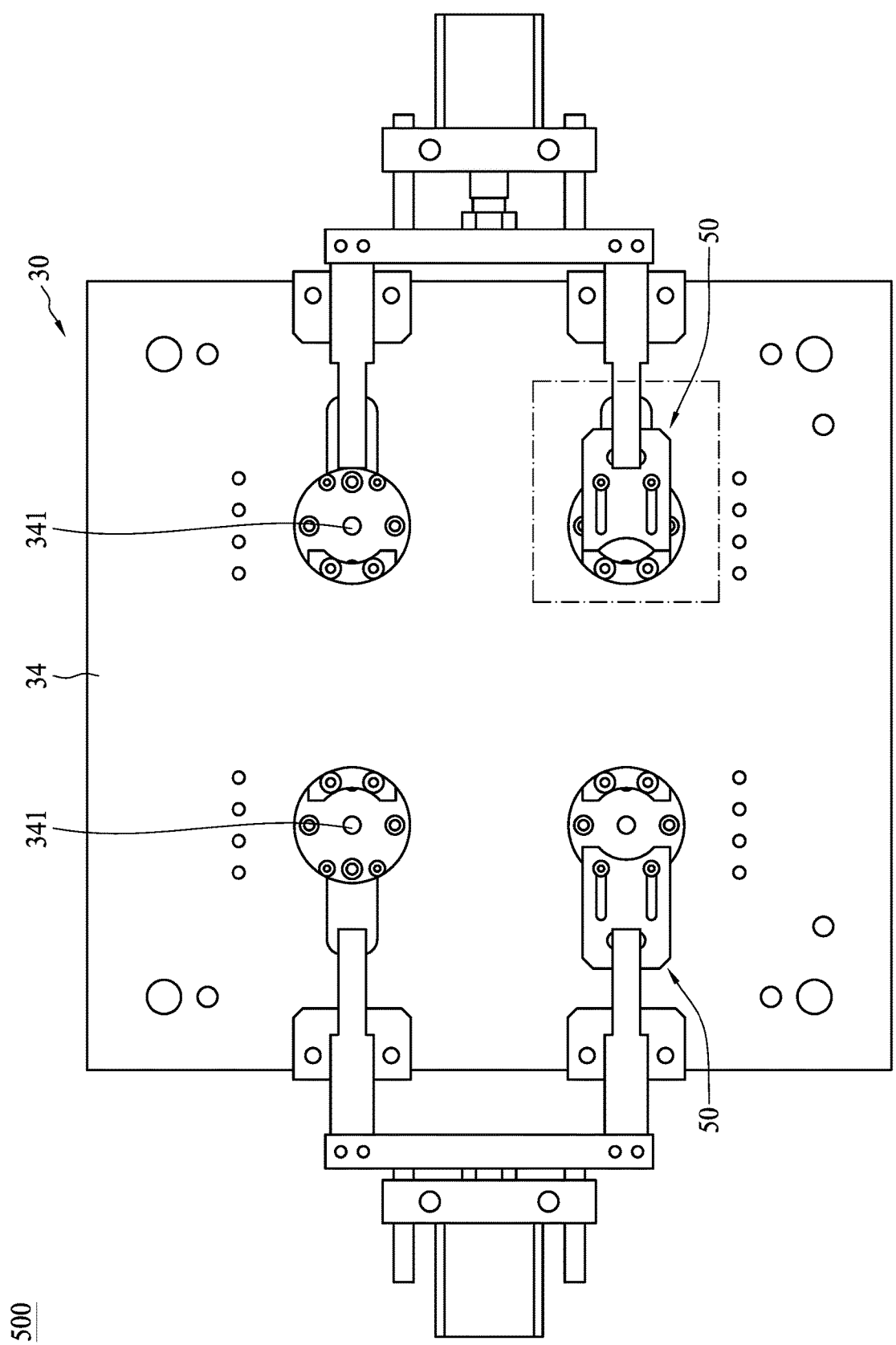
FIG. 14 is a schematic diagram of a portion of an injection-molding system according to one embodiment of the present invention.
Figure 15:
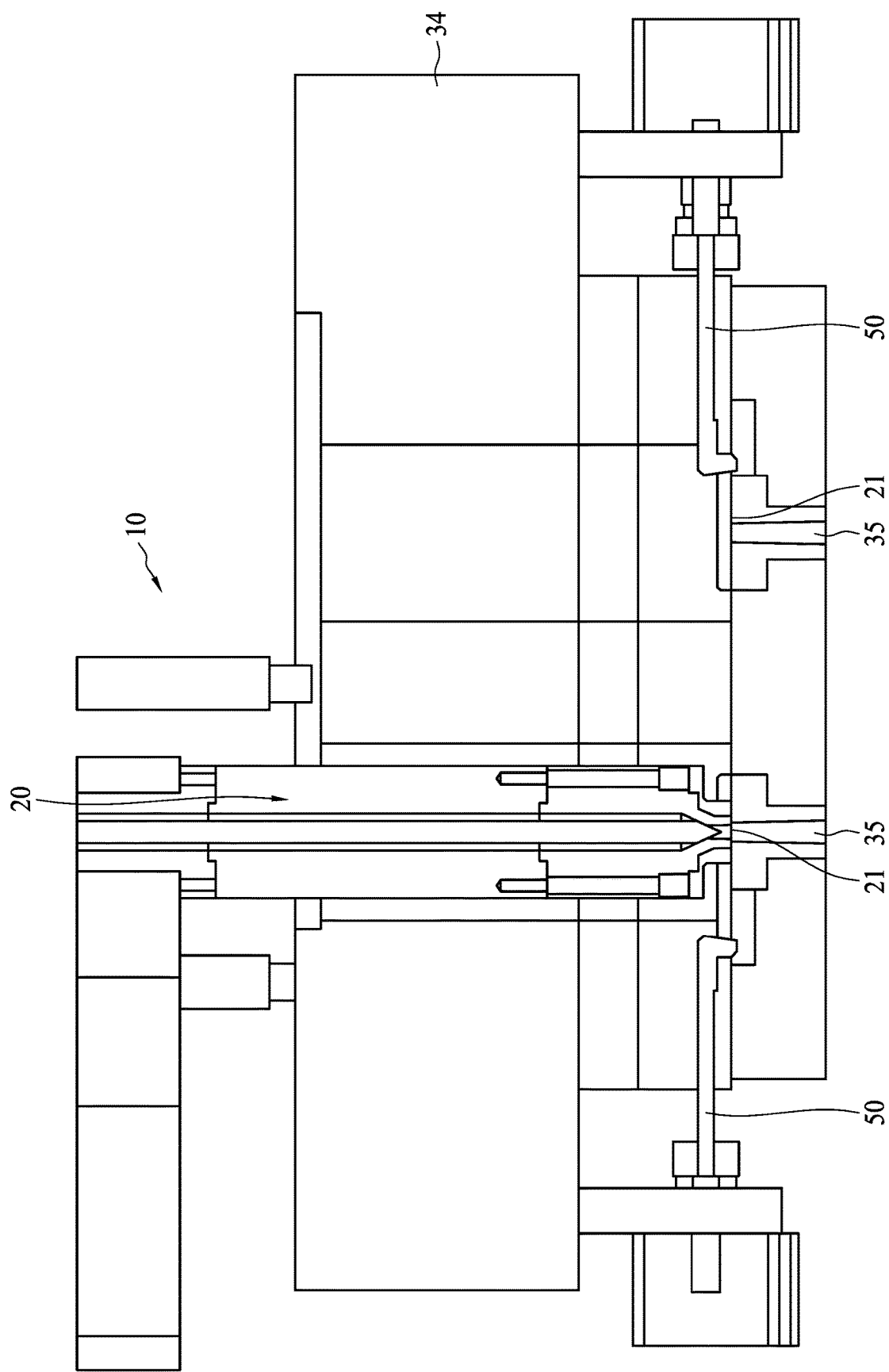
FIG. 15 is a schematic diagram of a portion of the injection-molding system in FIG. 14 according to one embodiment of the present invention.

FIG. 14 is a top view of a portion of the injection-molding system 500 according to one embodiment of the present invention. FIG. 15 is a schematic diagram of a portion of the injection-molding system 500 according to one embodiment of the present invention. After injection of the mixture into the molding device 30, the discharging channels 20 are disengaged from the feeding ports 35, at which point the mixture in the molding device 30 may overflow out of the molding device 30 from the feeding port 35 and the opening 341. In some embodiments, referring to FIG. 14 and FIG. 15, the injection-molding system 500 further includes a cover 50 configured to prevent the overflow of the mixture. In some embodiments, the cover 50 is configured to stop the mixture from overflowing from the feeding port 35 of the upper mold 32. In some embodiments, the cover 50 is configured to cover the feeding port 35 of the upper mold 32. In some embodiments, the cover 50 is configured to stop the mixture from overflowing from the feeding port 35 of the upper mold 32 and the opening 341 of the upper mold base 34. In some embodiments, the cover 50 is configured to cover the feeding port 35 of the upper mold 32 and the opening 341 of the upper mold base 34. In some embodiments, the cover 50 is moved to cover the feeding port 35 immediately after the discharging channel 20 is withdrawn from the upper mold base 34.

In some embodiments, the cover 50 is attached to the molding device 30. The cover 50 may be an individual element or module disposed between the molding devices 30 and the discharging channels 20. In some embodiments, the cover 50 is attached to the upper mold base 34. The number of covers 50 is not particularly limited. In some embodiments, the number corresponds to the number of the openings 341 of the upper mold base 34 or the number of the feeding ports 35.

Figure 16:
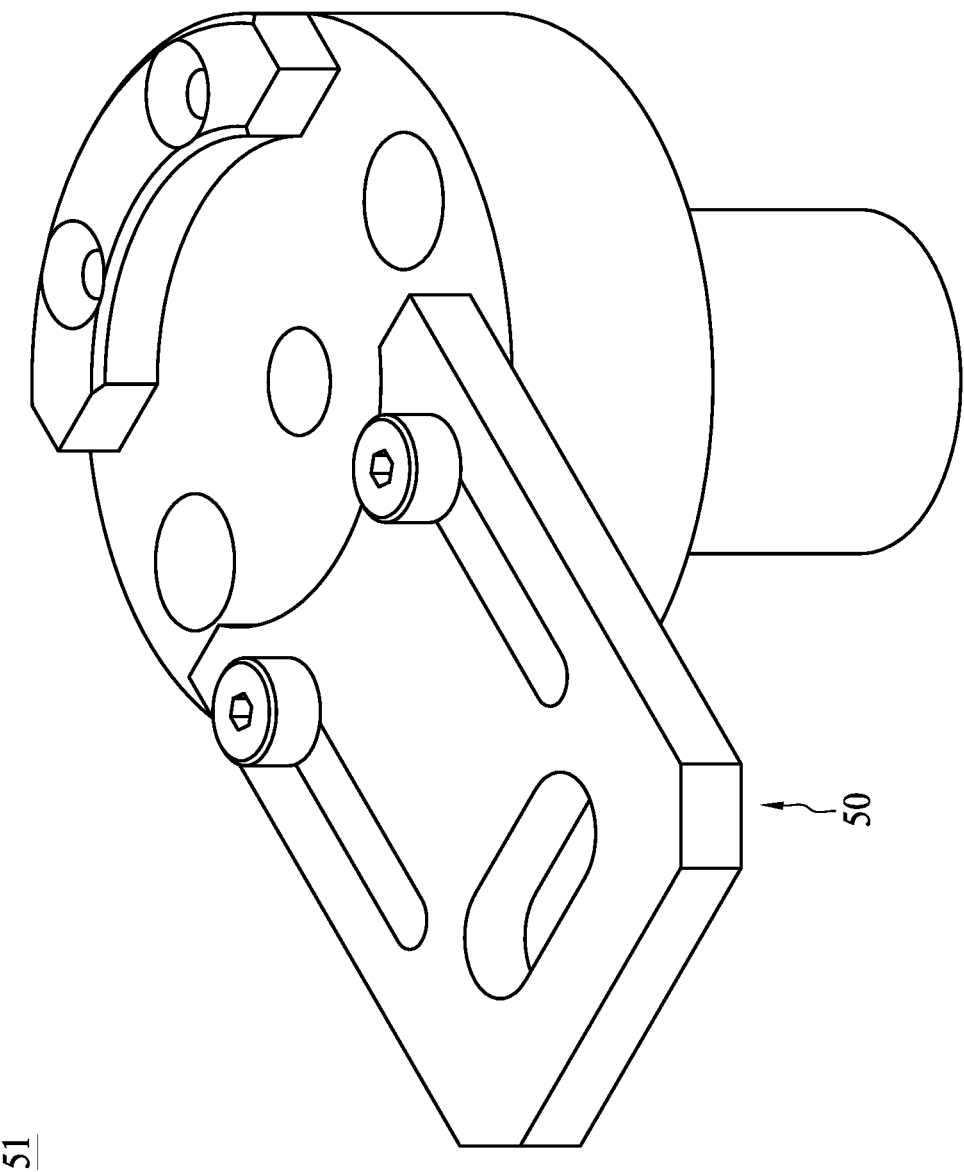
FIG. 16 is a schematic diagram of a portion of the injection-molding system in FIG. 14 according to one embodiment of the present invention.
Figure 17:
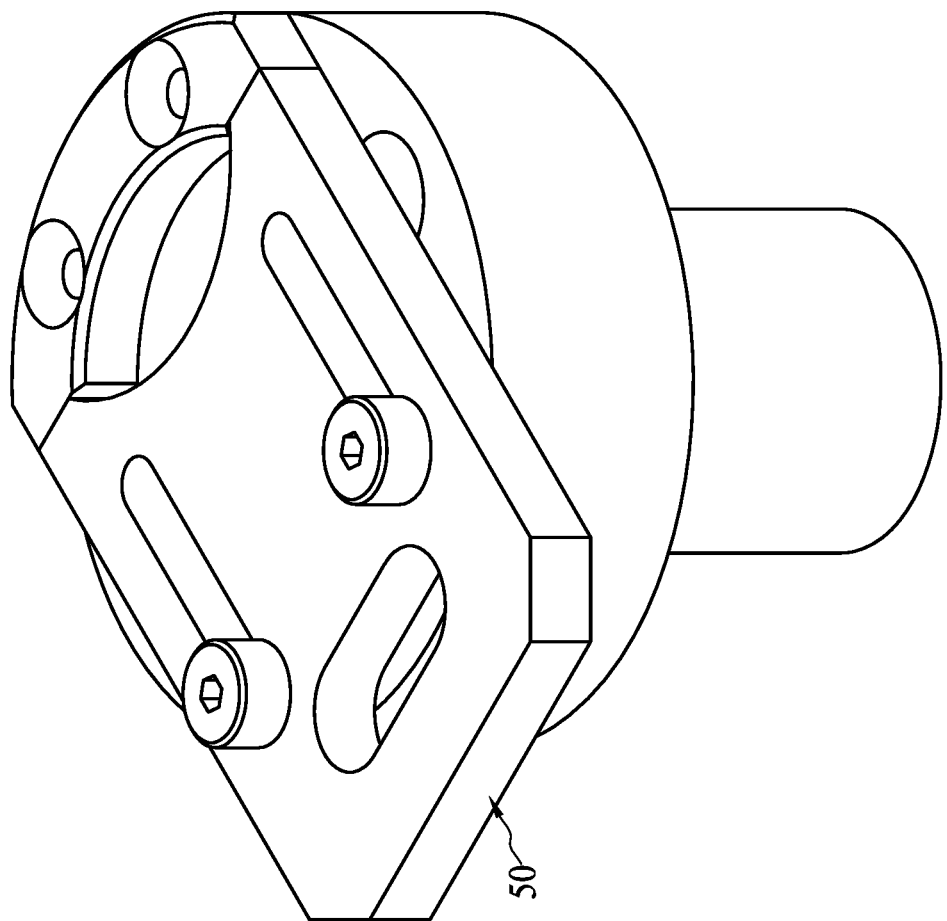
FIG. 17 is a schematic diagram of a portion of the injection-molding system in FIG. 14 according to one embodiment of the present invention.

FIG. 16 and FIG. 17 are schematic diagrams of a portion of the injection-molding system according to one embodiment of the present invention. Referring to FIG. 16 and FIG. 17, the cover 50 is configured to move between a first position 51 and a second position 52. At the first position 51, the cover 50 is away from the opening 341 and the corresponding feeding port 35, and the corresponding discharging channel 20 can engage with the corresponding feeding port 35. At the second position 52, the cover 50 covers the corresponding opening 341 and the corresponding feeding port 35, and the corresponding discharging channel 20 cannot engage with the corresponding feeding port 35. In some embodiments, the cover 50 can be operated manually or automatically. In some embodiments, movement of the cover 50 can be controlled manually or automatically by the control system 60 in real time. In some embodiments, the cover 50 is moved from the first position 51 to the second position 52 to cover the feeding port 35 immediately after the discharging channel 20 is withdrawn from the upper mold base 34.

Figure 18:
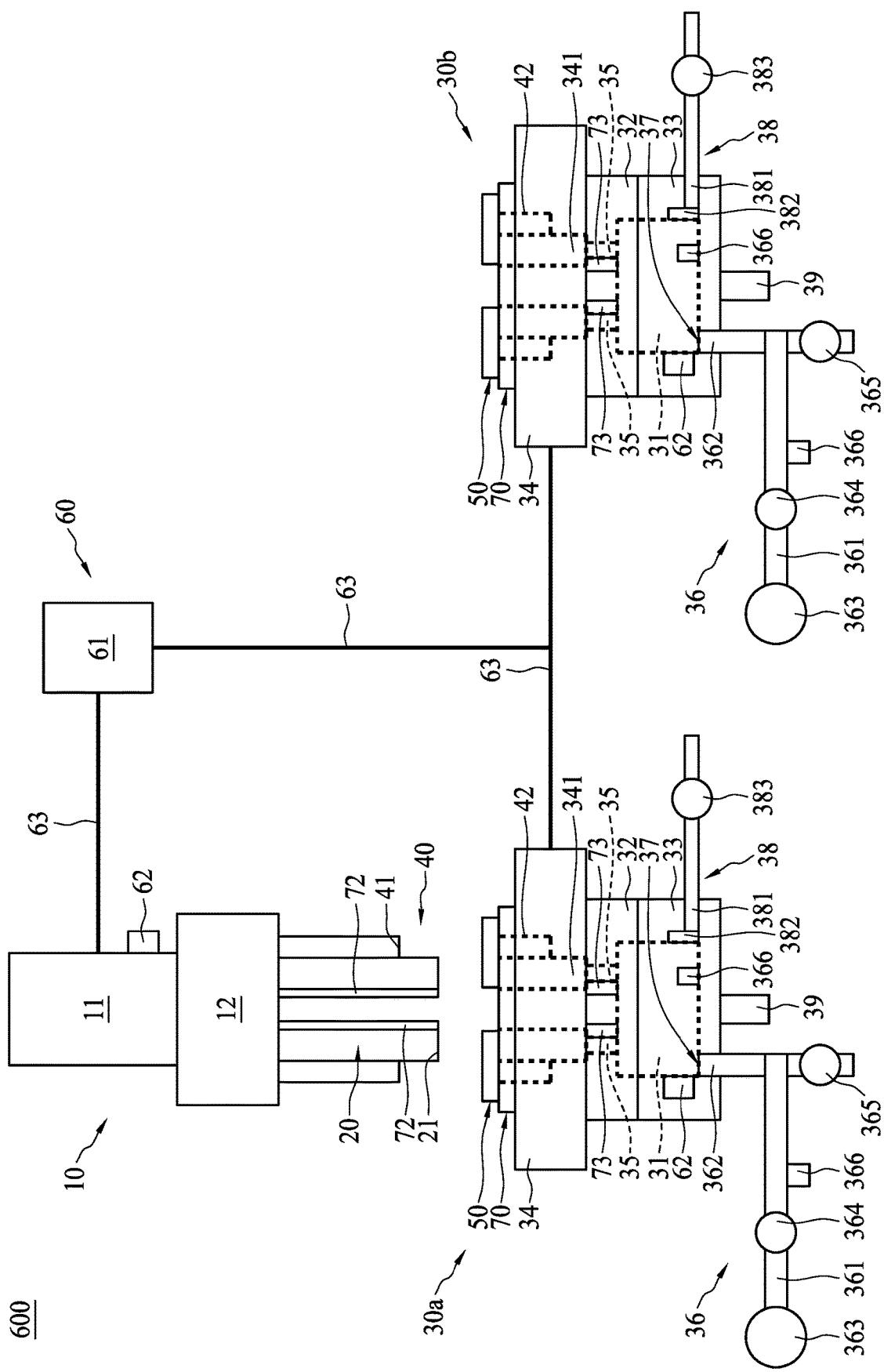
FIG. 18 is a schematic diagram of an injection-molding system according to one embodiment of the present invention.

FIG. 18 is a schematic diagram of an injection-molding system 600 according to one embodiment of the present invention. The injection-molding system 600 includes an extruding system 10, discharging channels 20 and a plurality of molding devices 30*a*, 30*b*. The injection-molding system 600 further includes a supporting device 40, covers 50, a control system 60, an insulator 70, and heaters 72, 73. Each of the molding devices 30 includes a hollow space 31, an upper mold 32, a lower mold 33, an upper mold base 34, and a feeding port 35. Each of the molding devices 30*a*, 30*b* may further include, for example, a pressure-regulating system 36, a junction point 37, a venting unit 38, and/or a sealing element 39 as described above or shown in FIGS. 1 and 12.

Figure 19:
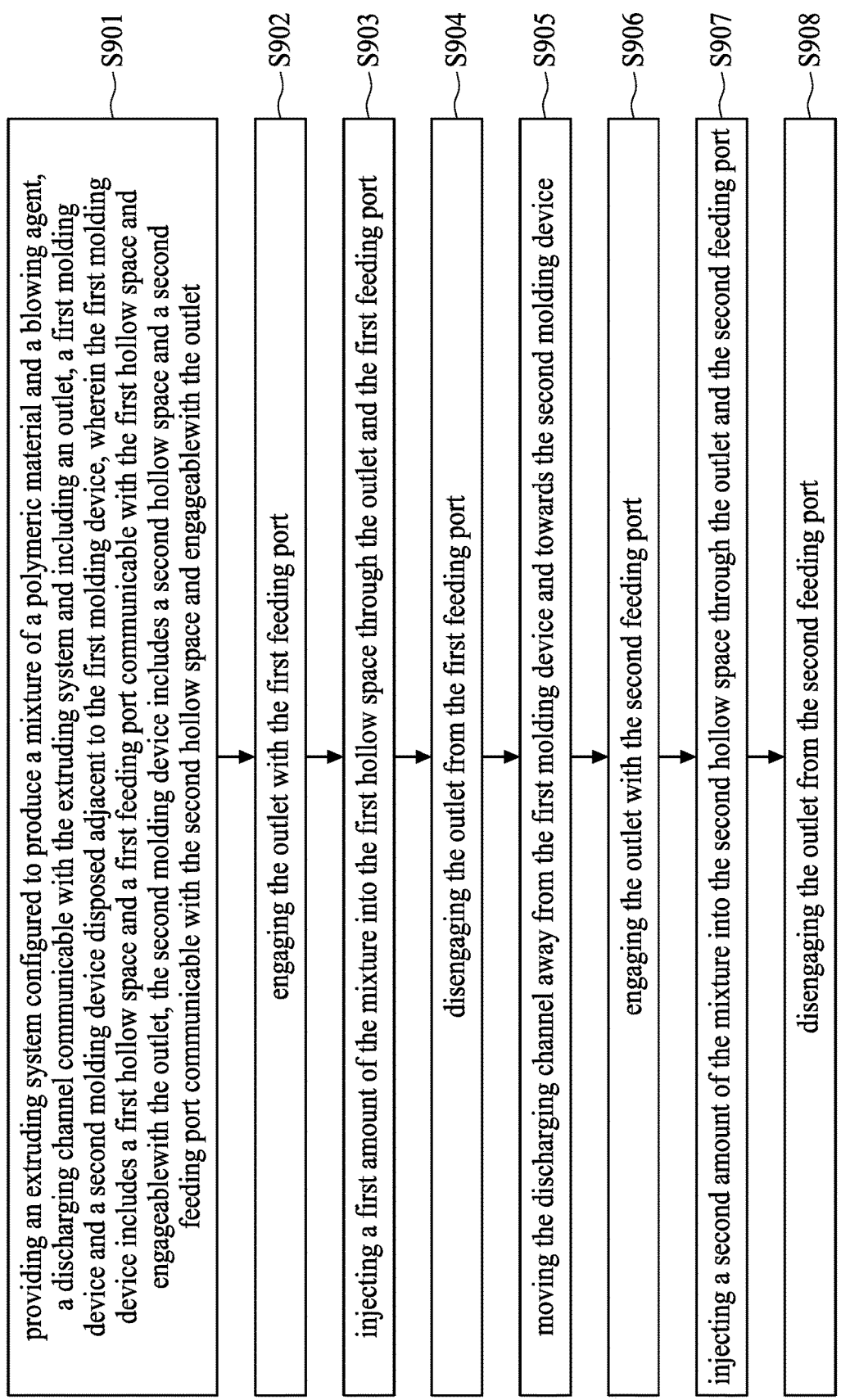
FIG. 19 is a flowchart illustrating a method of injection molding according to one embodiment of the present invention.

In the present disclosure, a method of injection molding is disclosed. In some embodiments, an injection molding is performed by the method. The method includes a number of operations and the description and illustrations are not deemed as a limitation of the sequence of the operations. FIG. 19 is a flowchart illustrating a method of injection molding according to one embodiment of the present invention. In some embodiments, as shown in FIG. 19, the method of injection molding 900 includes the following steps.

Step 901 includes providing an extruding system configured to produce a mixture of a polymer and a blowing agent, a discharging channel communicable with the extruding system and including an outlet, a first molding device and a second molding device disposed adjacent to the first molding device. The first molding device includes a first hollow space and a first feeding port communicable with the first hollow space and engageable with the outlet. The second molding device includes a second hollow space and a second feeding port communicable with the second hollow space and engageable with the outlet.

Step 902 includes engaging the outlet with the first feeding port.

Step 903 includes injecting a first amount of the mixture into the first hollow space through the outlet and the first feeding port.

Step 904 includes disengaging the outlet from the first feeding port.

Step 905 includes moving the discharging channel away from the first molding device and toward the second molding device.

Step 906 includes engaging the outlet with the second feeding port.

Step 907 includes injecting a second amount of the mixture into the second hollow space through the outlet and the second feeding port.

Step 908 includes disengaging the outlet from the second feeding port.

The method 900 is not limited to the above-mentioned embodiments. In some embodiments, the method of injection molding 900 uses any of the above-mentioned injection-molding systems 100, 200, 300, 400, 500 and 600 as shown in FIG. 1 to FIG. 18.

In some embodiments, the method of injection molding 900 includes step 901, which includes providing an extruding system 10 configured to produce a mixture of a polymer and a blowing agent, a discharging channel 20 communicable with the extruding system 10 and including an outlet 21, a first molding device 30a and a second molding device 30b disposed adjacent to the first molding device. The first molding device 30a includes a first hollow space 31 and a first feeding port 35 communicable with the first hollow space 31 and engageable with the outlet 21. The second molding device 30b includes a second hollow space 31 and a second feeding port 35 communicable with the second hollow space 31 and engageable with the outlet 21.

In some embodiments as shown in FIG. 5 to FIG. 8, the first molding device 30a and the second molding device 30b are arranged in a line, a row, a column, an arc, a curve or any other suitable arrangements.

In some embodiments, the pressure-sensing unit 366 of the first molding device 30a senses that the pressure in the first hollow space 31 is equal to atmospheric pressure. In some embodiments, the pressure-sensing unit 366 continuously senses the pressure in the first hollow space 31, and the gas is injected into the first hollow space 31 from the gas source 363 through at least the first gas conduit 361, the first valve 364 and the junction point 37, until the pressure-sensing unit 366 is sensed that the first hollow space 31 has a first predetermined pressure; next, the first valve 364 is closed, and the gas injection into the first hollow space 31 is stopped. In some embodiments, the first predetermined pressure is greater than the atmospheric pressure. In some embodiments, the first predetermined pressure is less than the atmospheric pressure.

In some embodiments, the gas is any suitable gas depending on the need; for example, air; however, the present invention is not limited thereto.

In some embodiments, the upper mold 32 is sealed to the corresponding lower mold 33 by the sealing element 39.

In some embodiments, the valve 383 of the venting unit 38 is closed. The supporting unit 40 is in a unlock state. In some embodiments, before the mixture is injected into the hollow space 31 the cover 50 is disposed at the second position 52 to cover the first feeding port 35.

In some embodiments, a temperature difference is provided between the first molding device 30a and the discharging channels. In some embodiments, referring to FIG. 13, the heater 72 disposed on the discharging channel 20 heats the discharging channel 20 to a predetermined temperature. In some embodiments, the heater 73 disposed in the upper mold 32 heats the feeding port 35 to a predetermined temperature.

In some embodiments, the method 900 includes step 902, which includes engaging the outlet 21 with the first feeding port 35 of the first molding device 30a.

In some embodiments, referring back to FIG. 18, at the beginning of step 901, the extruding system 10 and the discharging channels 20 are away from the molding devices 30a, 30b.

Figure 20:
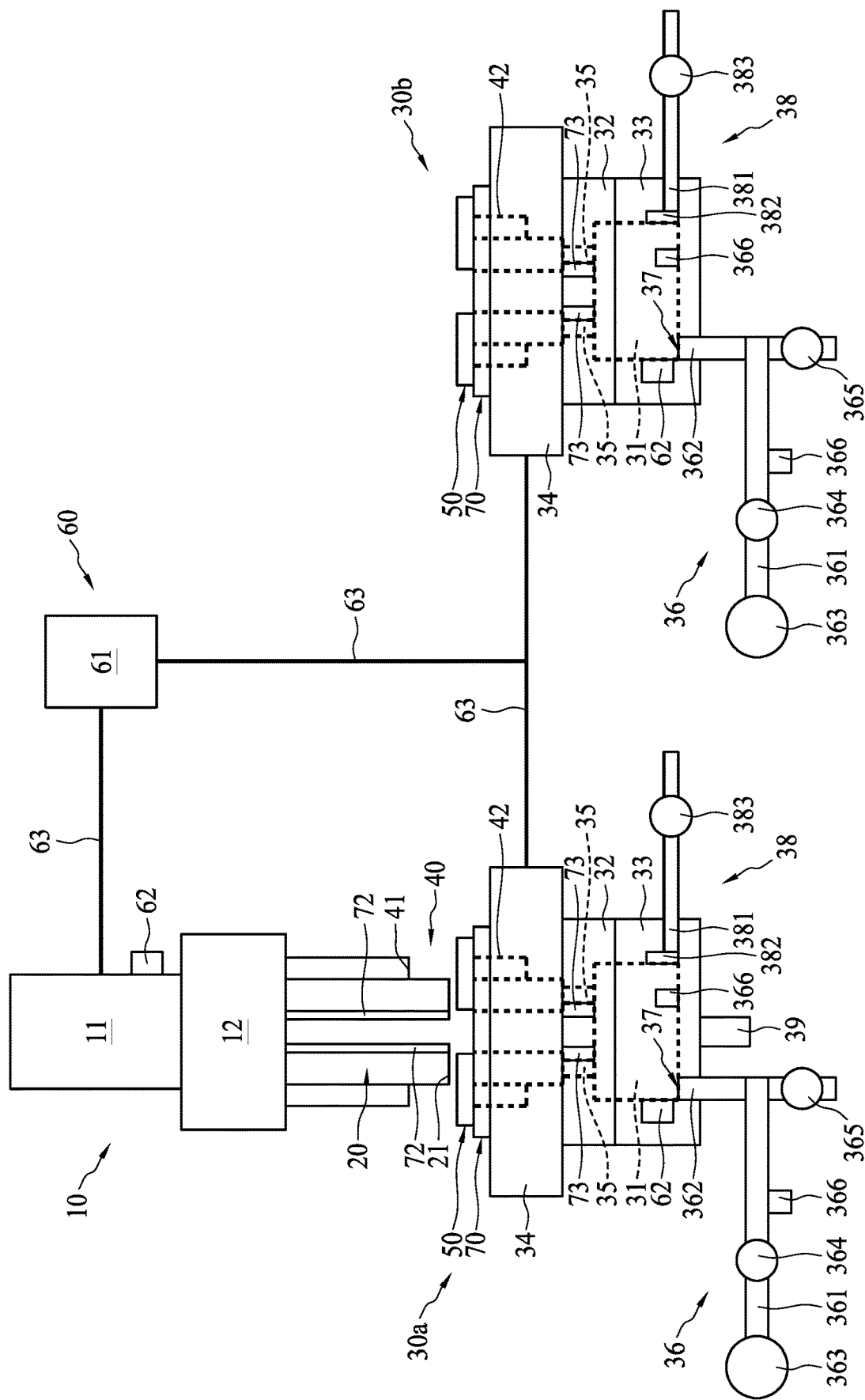
FIG. 20 to FIG. 27 are schematic diagrams illustrating exemplary operations for method of injection molding according to one embodiment of the present disclosure

Referring to FIG. 20, before the engagement of the outlet 21 with the first feeding port 35 of the first molding device 30a, the discharging channels 20 are moved to a first position above the first molding device 30a. In some embodiments, the discharging channels 20 are moved horizontally to the first position above the first molding device 30a. At the first position, the discharging channels 20 are aligned with the corresponding openings 341 of the upper old base 34 of the first molding device 30a. In some embodiments, a distance between each outlet 21 and the upper surface of the upper mold base 34 is greater than 0.

Figure 21:
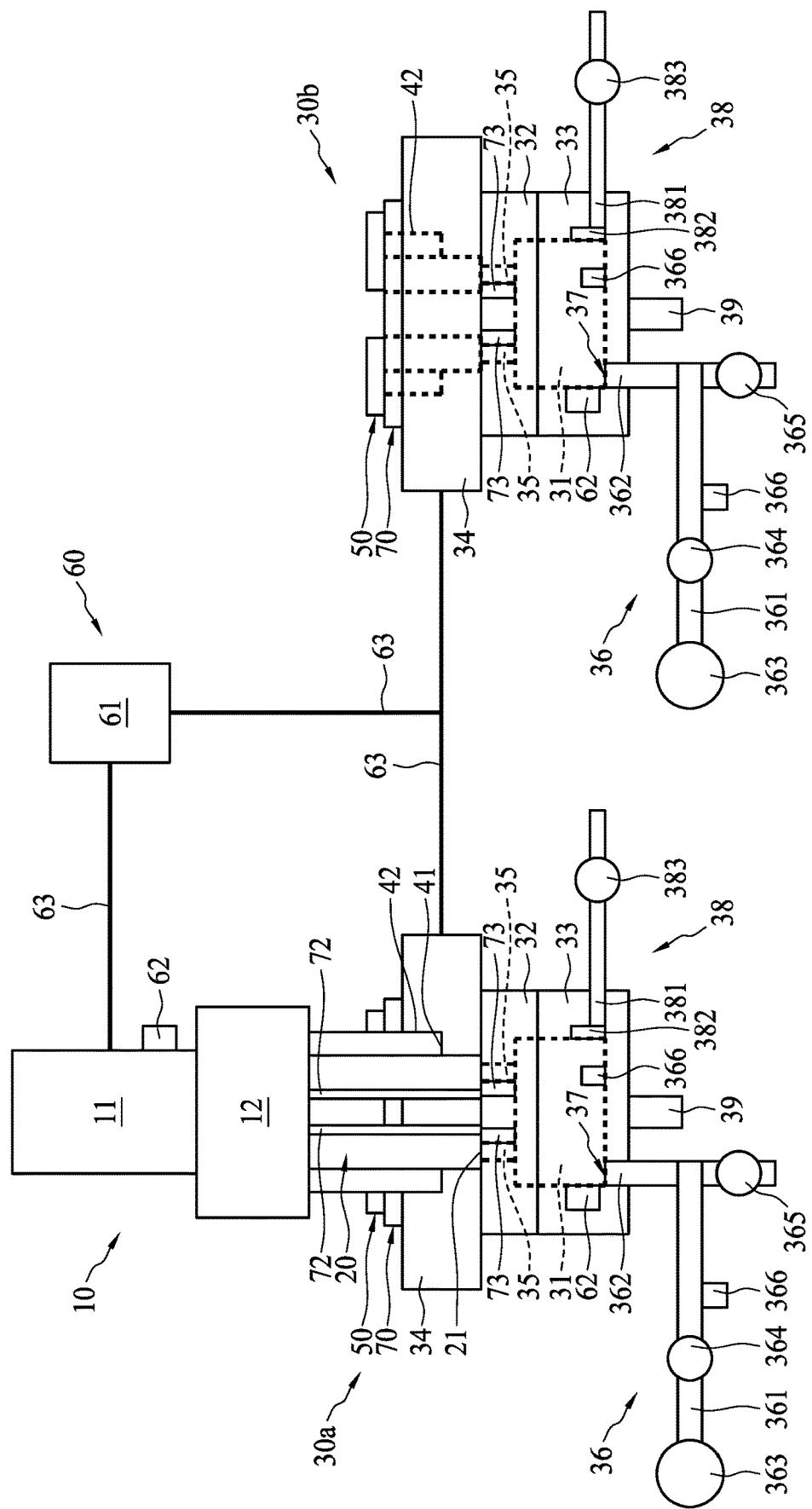

Referring to FIG. 21, after the vertical alignment of the discharging channels 20 with the corresponding openings 341, the discharging channels 20 are moved toward the first molding device 30a to be received by the corresponding openings 341 of the upper mold base 34, and then the outlets 21 are docked to the corresponding first feeding ports 35. In some embodiments, the discharging channels 20 are moved vertically toward the first molding device 30a to be received by the corresponding openings 341 of the upper mold base 34.

After the outlets 21 are docked to the first feeding ports 35, the outlets 21 and the corresponding first feeding ports 35 form flow paths of the mixture, such that the discharging channels 20 are communicable with the hollow space 31 through the first feeding ports 35. The outlets 21 must be tightly engaged with the corresponding first feeding port 35 in order to prevent the mixture from leaking out of the first molding device 30a.

In some embodiments, when the mixture is ready to be injected by the extruding system 10, the discharging channels 20 are aligned with the first molding device 30 and the cover 50 of the first molding device 30 is slid from the second position 52 to the first position 51. After the movement of the cover 50 from the second position 52 to the first position 51, the outlets 21 can engage with the corresponding first feeding ports 35. After the engagement of the outlets 21 and the first feeding portion 35, the pressure in the hollow space 31 of the first molding device 30a is adjusted to the predetermined level. After the pressure in the first molding device 30a has the predetermined level, the injection begins. The cover 50 remains at the first position 51 during the injection of the mixture.

In some embodiments, the method 900 further includes securing the discharging channels 20 to the first molding device 30a by turning the supporting unit 40 into the lock state, such as rotating a first element 41 of the supporting device 40 relative to and within a second element 42 of the supporting device 40 while engaging the outlet 21 with the first feeding port 35. In some embodiments, when the outlets 21 are docked to the first feeding ports 35, the first element 41 enters the second element 42 and then locked with the second element 42.

In some embodiments, the first hollow space 31 has the first predetermined pressure in Step 902, and the first valve 364 and the second valve 365 of the pressure-regulating system 36 and the valve 383 of the venting unit 38 are closed.

In some embodiments, the heaters 72 heats the discharging channels 20 to keep the temperature of the discharging channels 20 within a predetermined range. In some embodiments, the heater 73 heats the first feeding port 35 to maintain the temperature of within the first feeding port 35 the predetermined range.

Step 903 includes injecting a first amount of the mixture into the first hollow space 31 through the outlet 21 and the first feeding port 35. In some embodiments, the discharging channel 20 is at least partially surrounded by the first molding device 30a upon the injection of the first amount of the mixture.

Figure 22:
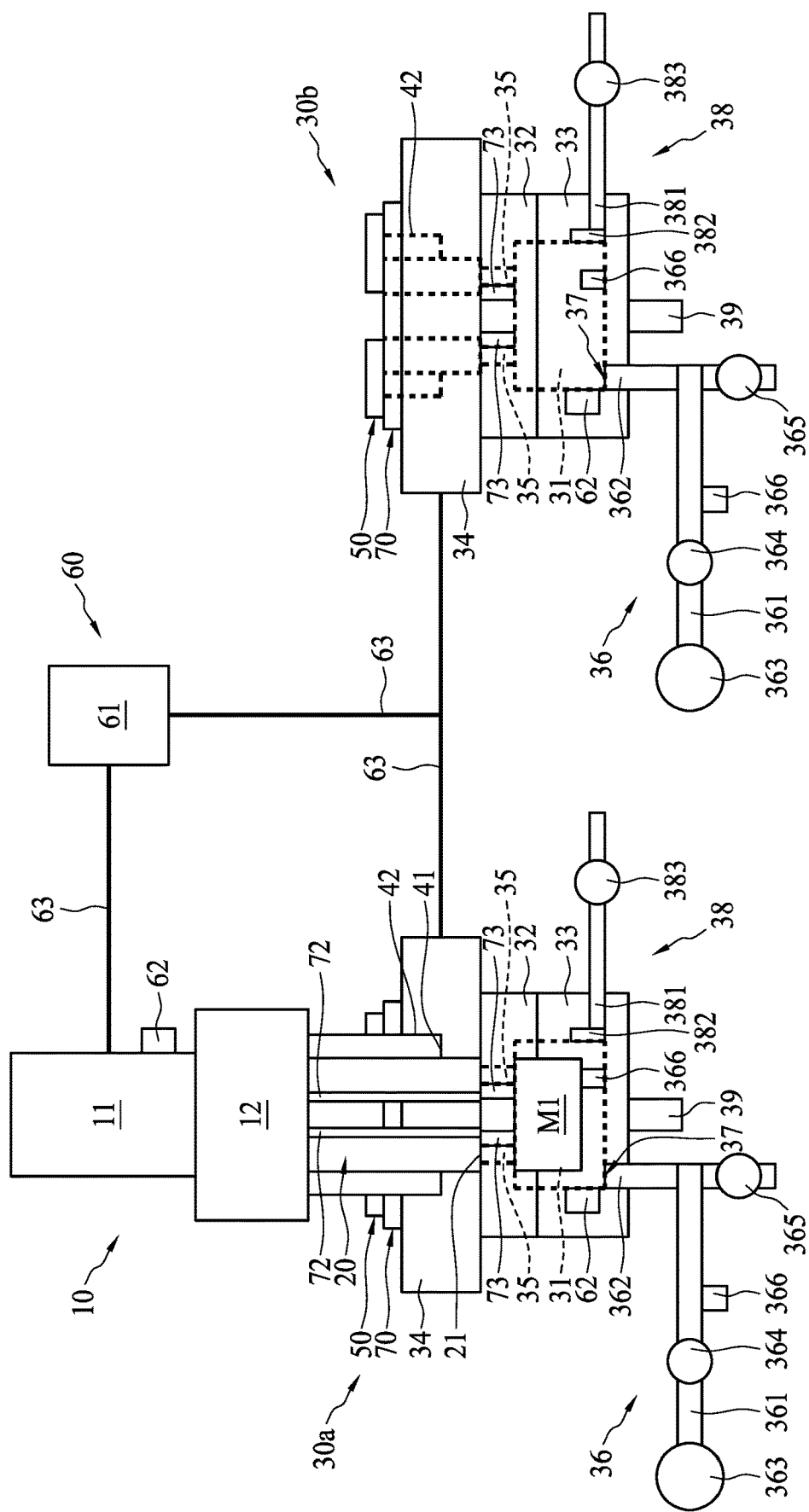

In some embodiments, referring to FIG. 22, in step 903, during the process of injecting the first amount of the mixture M1 into the first hollow space 31 of the first molding device 30a, the pressure in the first hollow space 31 changes rapidly, and the pressure-sensing unit 366 continuously senses the pressure in the first hollow space 31. In some embodiments, the first amount of the mixture M1 is injected into the first hollow space 31 of the first molding device 30a from the first feeding port 35, thereby increasing the pressure in the first hollow space 31. In some embodiments, the pressure in the hollow space 31 of the first molding device 30a is raised above the first predetermined pressure. In some embodiments, the pressure in the first hollow space 31 of the first molding device 30a is raised from the first predetermined pressure to a second predetermined pressure.

In some embodiments, after the first amount of the mixture M1 is injected into the first hollow space 31 having the first predetermined pressure, the pressure in the hollow space 31 increases, and therefore, the setting of a second predetermined pressure ensures that the first hollow space 31 is maintained within a suitable pressure range. In some embodiments, when the first hollow space 31 reaches the second predetermined pressure, the injection of the first amount of the mixture M1 into the first hollow space 31 is stopped.

In some embodiments, the process of injecting the first amount of the mixture M1 into the first hollow space 31 having the first predetermined pressure lasts only 0.5 to 1 second. During the injecting period or at the moment of the completion of the injection, the pressure in the first hollow space 31 is sensed by the pressure-sensing unit 366 in real time, and the pressure information is provided, so that the pressure-regulating system 36 can adjust the pressure in the first hollow space 31 in accordance with the pressure information, and hence, the pressure in the first hollow space 31 can be kept within the predetermined pressure range.

In some embodiments, a force is provided by the support device 40 to prevent the separation of the extruding system 10 from the first molding device 30a. In some embodiments, in step 903, when the mixture is injected from the outlet 21 into the molding device 30, the molding device 30 may generate a reaction force opposite to an injection direction, and the reaction force may be transmitted to the discharging channels 20 and the extruding system 10, so that the discharging channels 20 tend to separate from the molding device 30. In some embodiments, the supporting unit 40 provides support against the reaction force opposite to the injection direction.

In some embodiments, in step 903, the cover 50 of the first molding device 30a is disposed at the first position 51 (as illustrated in FIG. 16) during the process of injection.

In some embodiments, during the process of injection, the temperature of the discharging channel 20 is greater than that of the first molding device 30a. In some embodiments, the temperature difference is maintained using the insulator 70 and the heaters 72, 73.

In some embodiments, step 903 includes discharging a portion of the gas from the first hollow space 31 after injecting the gas into the first hollow space 31. In some embodiments, when the pressure-sensing unit 366 senses that the pressure in the first hollow space 31 is greater than the second predetermined pressure, a portion of the gas in the first hollow space 31 is discharged through the junction point 37 and/or the venting unit 38 until the pressure in the first hollow space 31 is within a predetermined pressure range. In some embodiments, the predetermined pressure range is between the first predetermined pressure and the second predetermined pressure. In some embodiments, the second valve 365 is open and a portion of the gas in the first hollow space 31 is discharged through the second gas conduit 362. In some embodiments, the valve 383 is open and a portion of the gas in the first hollow space 31 is passed through the shutter 382 and discharged through the gas conduit 381 of the venting unit 38.

Step 904 includes disengaging the outlet 21 from the first feeding port 35 of the first molding device 30a. In some embodiments, after the injection of the mixture into the first hollow space 31, the discharging channels 20 are disengaged from and moved away from the first molding device 30a.

Figure 23:
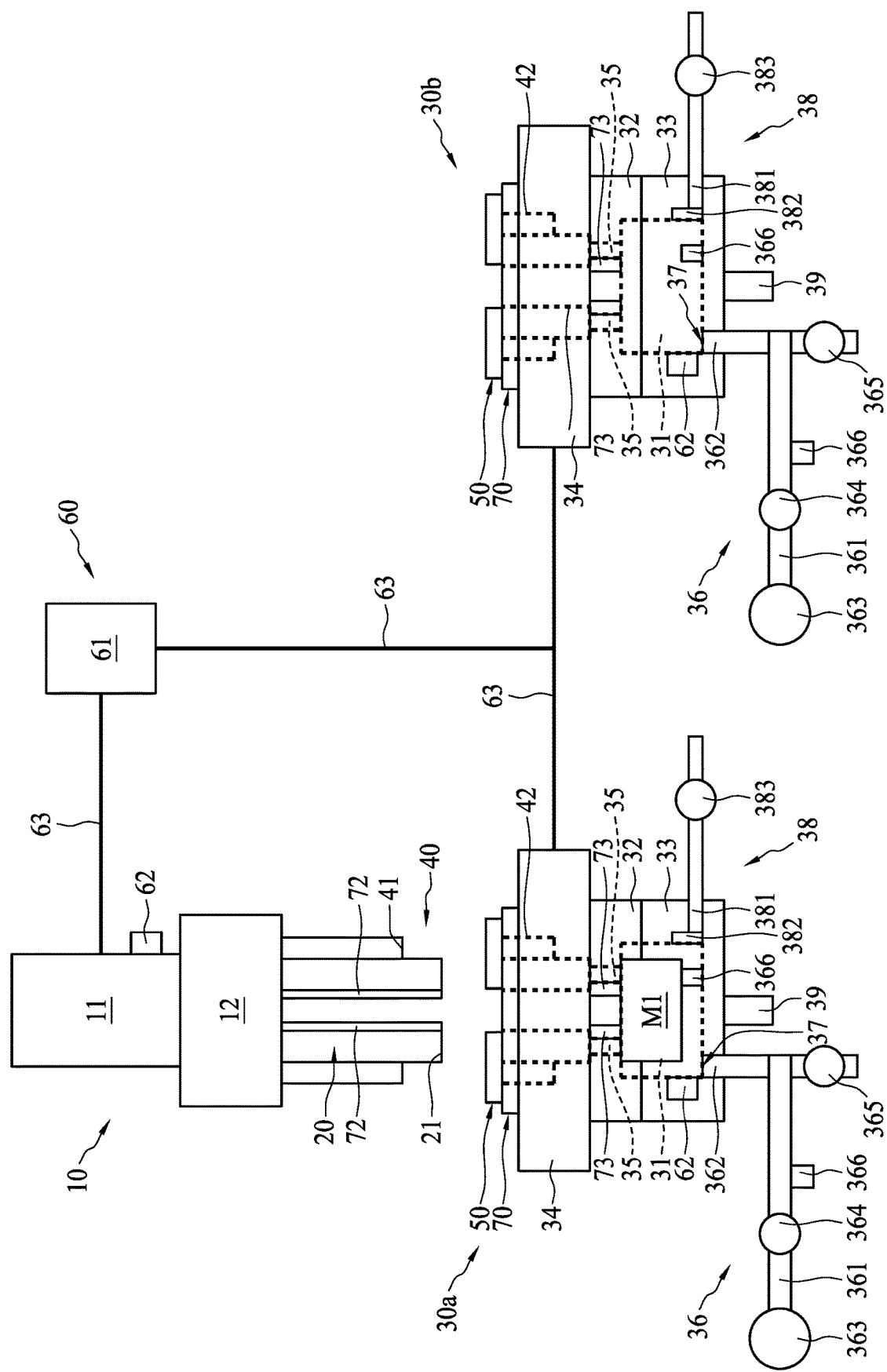

In some embodiments, referring to FIG. 23, before the disengaging of the outlet 21 from the first feeding port 35, the supporting unit 40 is shifted into the unlocked state. In some embodiments, the supporting unit 40 is changed from locked state to unlocked state by rotating a first element 41 of the supporting device 40 relative to and within a second element 42 of the supporting device 40 to unlock the discharging channel 20 from the first molding device 30a. In some embodiments, during the disengagement of the outlet 21 from the first feeding port 35, the first element 41 is unlocked from the second element 42 and is then pulled away from the second element 42.

In some embodiments, the method 900 further includes covering the first feeding port 35 upon or after the disengagement of the outlet 21 from the first feeding port 35. When the outlet 21 is separated from the first feeding port 35, the cover 50 immediately slides from the first position 51 to the second position 52, so that the mixture in the first molding device 30a does not overflow from the first feeding port 35.

In some embodiments, the heater 73 of the first molding device 30a stops heating the first feeding port 35 after the disengagement of the outlet 21 from the first feeding port 35. In some embodiments, the heater 72 keeps heating the discharging channels 20.

Figure 24:
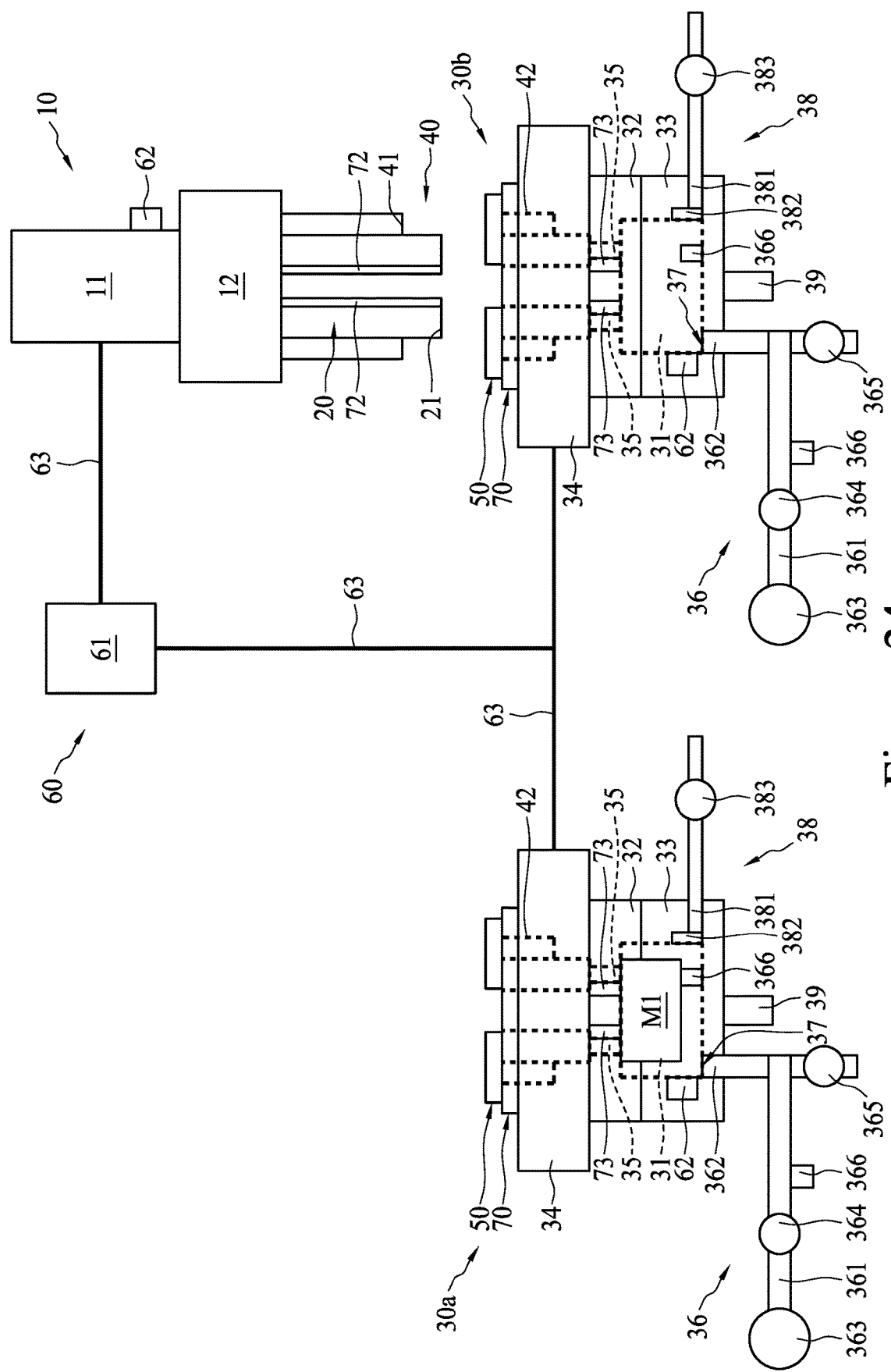

Step 905 includes moving the discharging channels 20 away from the first molding device 30a and toward the second molding device 30b. In some embodiments, referring to FIG. 24, the movement of the discharging channels 20 includes moving the discharging channels 20 from the first position above the first molding device 30a to a second position above the second molding device 30b. In some embodiments, the discharging channels 20 are moved vertically away from the first molding device 30a, and then moved horizontally to the second position above the second molding device 30b.

In some embodiments, the setting of the second molding device 30b in Step 905 is similar to the setting of the first molding device 30a in Step 901 and Step 902, and a detailed description thereof is omitted here for the sake of brevity.

Figure 25:
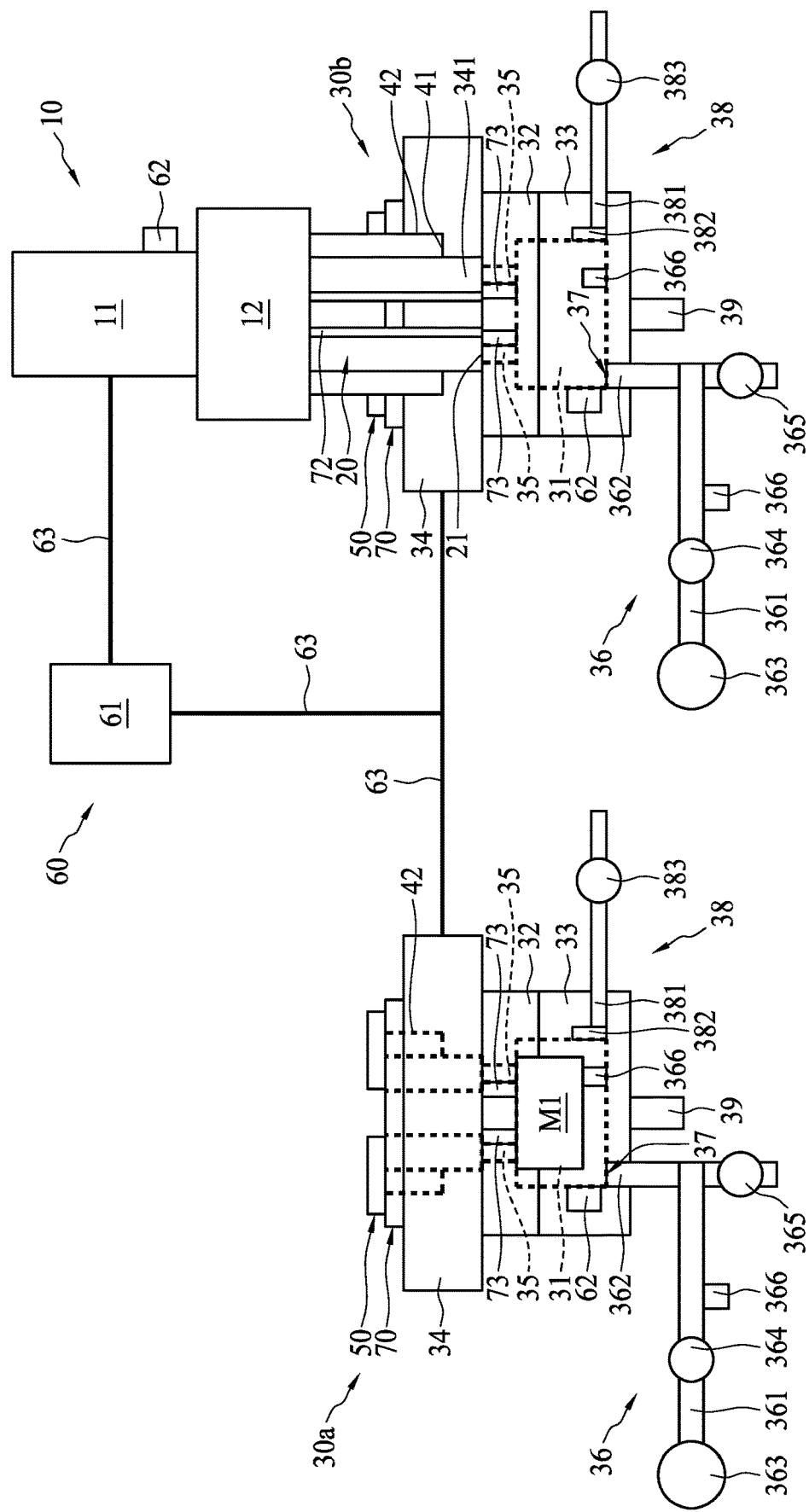

Step 906 includes engaging the outlet 21 with the second feeding port 35 of the second molding device 30b. In some embodiments, referring to FIG. 25, the discharging channels 20 are moved toward the second molding device 30b to be received by the corresponding openings 341 of the upper mold base 34 of the second molding device 30b, and then the outlets 21 are docked to the corresponding second feeding ports 35.

Figure 26:
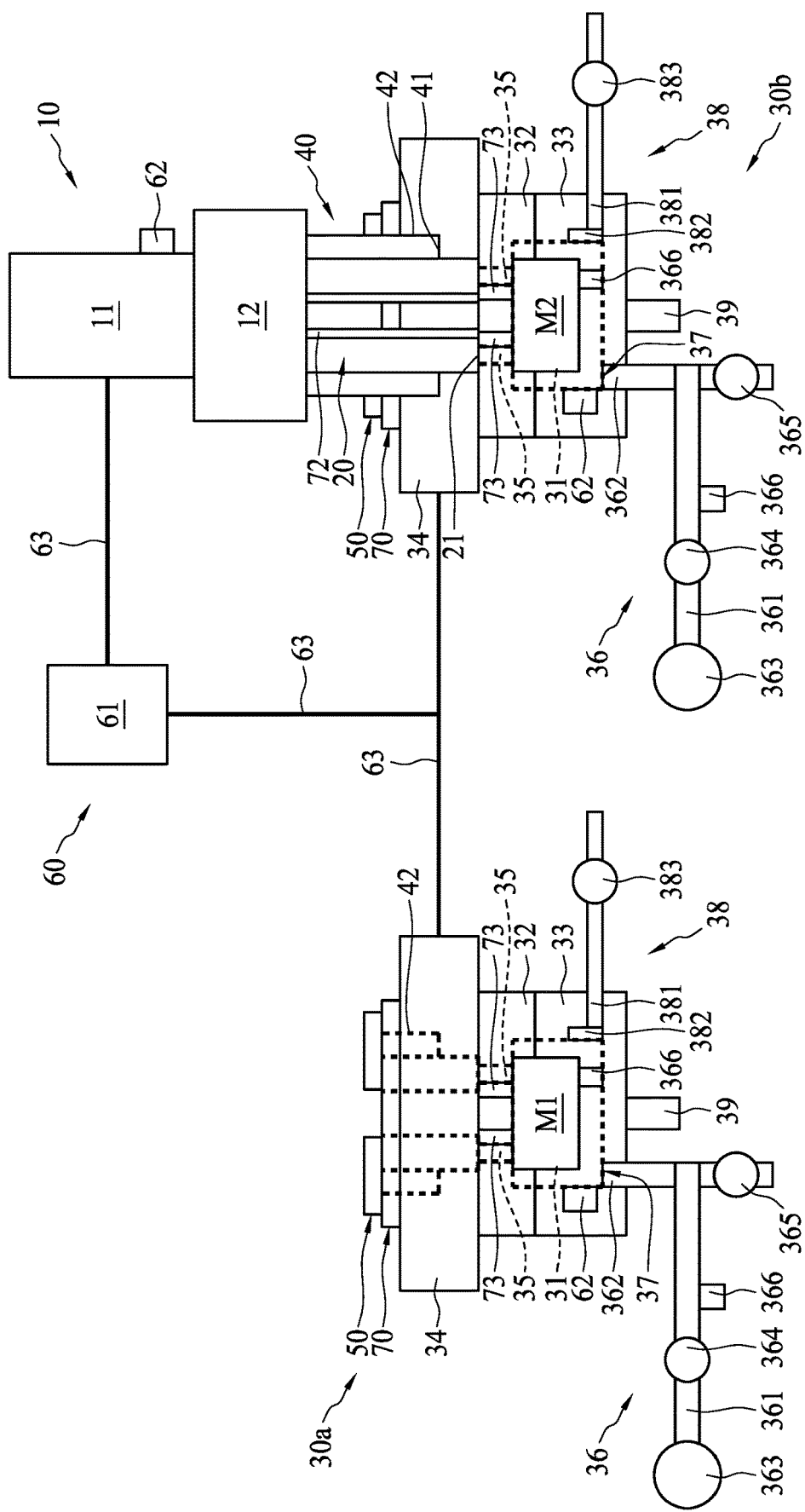

Step 907 includes injecting a second amount of the mixture into the second hollow space through the outlet 21 and the second feeding port 35 of the second molding device 30b. In some embodiments, referring to FIG. 26, the discharging channel 20 is at least partially surrounded by the second molding device 30b upon the injection of the second amount of the mixture M2.

Figure 27:
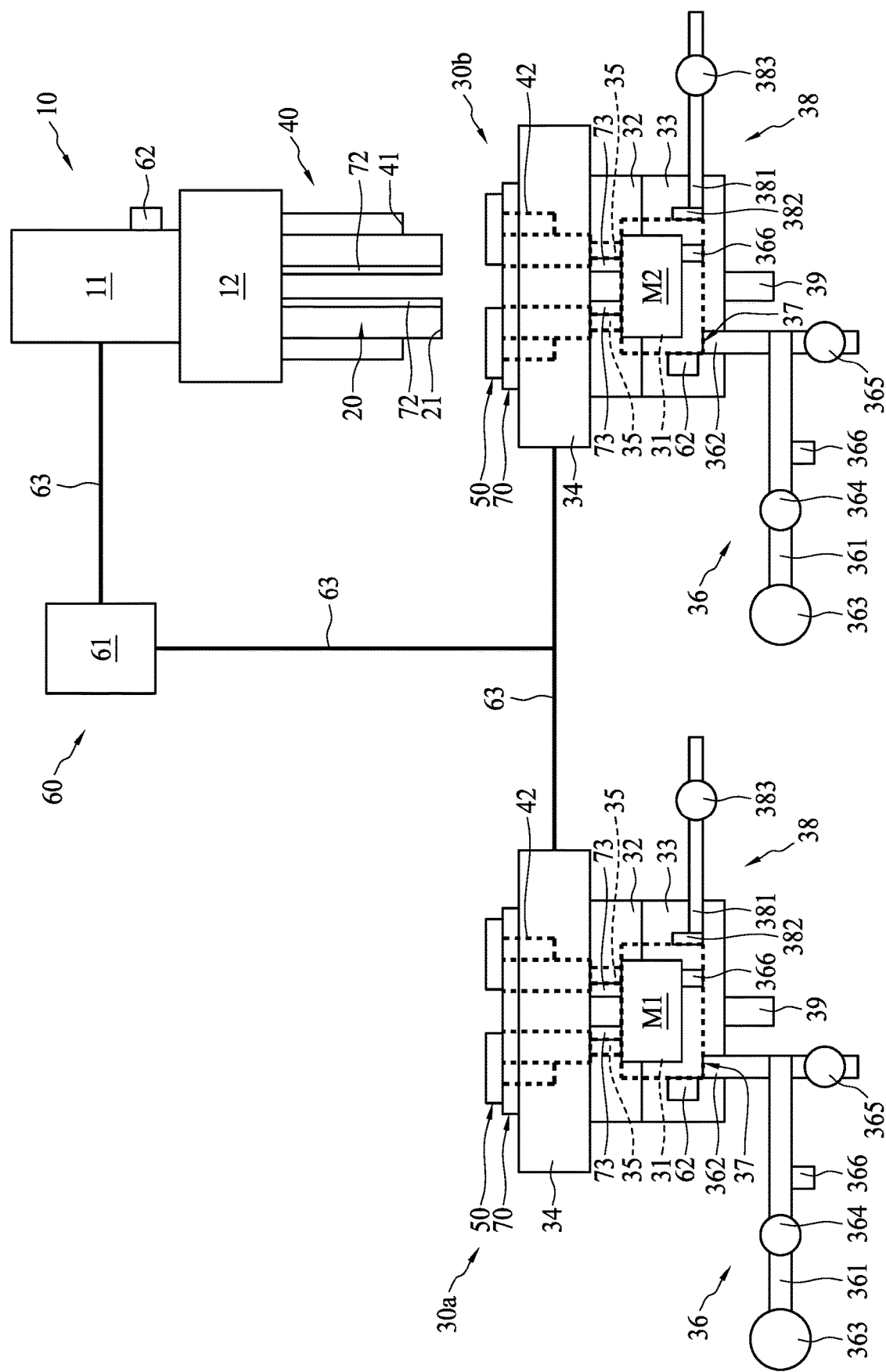

Step 908 includes disengaging the outlet from the second feeding port. In some embodiments, referring to FIG. 27, after the injection of the mixture into the second hollow space 31, the discharging channels 20 are disengaged from and moved away from the second molding device 30b. In some embodiments, the second feeding port 35 is covered upon or after the disengagement of the outlet 21 from the second feeding port 35.

Step 906, step 907 and step 908 are respectively similar to step 902, step 903 and step 904, and similar details are not repeated herein.

In the above-mentioned Step 901 to Step 908, the control system 60 automatically controls the extruding system 10, the discharging channels 20, the first and second molding devices 30a, 30b, the supporting device 40, the covers 50, and the insulator 70, the heaters 72, 73 in real time. In some embodiments, the control system 60 controls movement of the extruding system 10. In some embodiments, the control system 60 controls movement of the first and second molding devices 30a, 30b.

In some embodiments, a difference between a duration of the injection of the first amount of the mixture into the first molding device 30a and a duration of the injection of the second amount of the mixture into the second molding device 30b is substantially less than a sum of a first duration of the flow of the first amount of the mixture from the first feeding port 35 into the first hollow space 31 and a second duration of cooling the first amount of the mixture in the first hollow space 31.

In some embodiments, a third molding device 30c disposed adjacent to the second molding device 30b is provided. The third molding device 30c includes a third hollow space 31 and a third feeding port 35 communicable with the third hollow space 31 and engageable with the outlet 21. The method 900 further includes a step, which includes engaging the outlet 21 with the third feeding port 35; injecting a third amount of the mixture into the third hollow space 31 through the outlet 21 and the third feeding port 35; and disengaging the outlet 21 from the third feeding port 35. The step is similar to step 902, step 903 and step 904, and similar details are not repeated herein.

In some embodiments, a difference between the duration of the injection of the first amount of the mixture into the first molding device 30a and the duration of the injection of the second amount of the mixture into the second molding device 30b is substantially less than a sum of a third duration of the flow of the second amount of the mixture from the second feeding port 35 into the second hollow space 31 and a fourth duration of cooling the second amount of the mixture in the second hollow space 31.

In some embodiments, the third feeding port 35 is covered upon or after the disengagement of the outlet 21 from the third feeding port 35.

The method 900 is not limited to the above-mentioned embodiments. In some embodiments, the method of injection molding 900 uses any of the above-mentioned molding devices 100, 200, 300, 400, and 500 as shown in FIG. 1 to FIG. 18.

Referring to FIG. 8, in some embodiments, in step 905, the molding devices 30a, 30b, 30c, 30d, 30e are rotated about a central axis C, and thus the molding device 30a is moved away from the discharging channels 20, while the next molding device 30b is moved toward the discharging channels 20. The molding device 30b stops under and aligns with the discharging channels 20, and engages with the discharging channels 20. After the alignment and the engagement, the mixture is injected from the discharging channels 20 into the second molding device 30b.

In some embodiments, after step 908, the molding devices 30a, 30b, 30c, 30d, 30e are rotated about the central axis C, and thus the molding device 30b is moved away from the discharging channels 20 of the extruding system 10, while the molding device 30c is moved toward the discharging channels 20. The alignment, engagement and injection steps are repeated. After each of the molding devices 30a, 30b, 30c, 30d, 30e are filled with the mixture, the discharging channels 20 are withdrawn from the molding devices 30a, 30b, 30c, 30d, 30e.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:
1. An injection-molding system, comprising:
an extruding system configured to produce a mixture of a polymeric material and a blowing agent;
a plurality of discharging channels communicable with the extruding system, wherein each of the plurality of discharging channels includes an outlet disposed away from the extruding system and configured to discharge the mixture, and the outlets have same or different widths or diameters;
a plurality of molding devices configured to receive the mixture from the outlets, wherein each of the plurality of molding devices includes:
a hollow space; and
a plurality of feeding ports communicable with the hollow space and correspondingly engageable with the outlets, and the plurality of feeding ports have same or different widths or diameters;

an insulator disposed between one of the plurality of discharging channels and one of the plurality of molding devices, wherein the insulator is configured to maintain a temperature difference between the one of the plurality of discharging channels and the one of the plurality of molding devices, the plurality of discharging channels are extendable into the insulator and thereby at least partially surrounded by the insulator, each of the plurality of molding devices is movable relative to the extruding system and the plurality of discharging channels, and at least one of the plurality of the molding devices further includes a pressure-regulating system, wherein the pressure-regulating system includes a junction point in connection with the hollow space of the at least one of the plurality of molding devices, and a gas conduit coupled to the junction point.

2. The injection-molding system of claim 1, wherein the plurality of molding devices are arranged in a line or a curve.

3. The injection-molding system of claim 1, wherein the extruding system and the plurality of discharging channels are disposed over one of the plurality of molding devices.

4. The injection-molding system of claim 1, wherein each of the plurality of the molding devices further includes an upper mold base having openings and a mold disposed under the upper mold base, each of the plurality of discharging channels is receivable by corresponding one of the openings.

5. The injection-molding system of claim 4, wherein the plurality of discharging channels are stationary.

6. The injection-molding system of claim 1, further comprising a supporting device configured to facilitate an engagement of the plurality of discharging channels and each of the plurality of molding devices.

7. The injection-molding system of claim 6, wherein the supporting device includes first and second elements configured to engage with each other, the first element protrudes from the extruding system or the plurality of discharging channels, and the second element is disposed on each of the plurality of molding devices.

8. The injection-molding system of claim 1, further comprising a cover configured to move between a first position and a second position, wherein the first position is away from one of the feeding ports, and the second position is above one of the feeding ports.

9. The injection-molding system of claim 1, further comprising a control unit configured to control the plurality of discharging channels to sequentially discharge the mixture into each of the plurality of molding devices.

10. An injection-molding system, comprising:

an extruding system configured to produce a mixture of a polymeric material and a blowing agent;

a plurality of discharging channels communicable with the extruding system, wherein each of the discharging channels includes an outlet disposed distal to the extruding system and configured to discharge the mixture, and the outlets have same or different widths;

a plurality of molding devices configured to receive the mixture from the outlets, wherein each of the plurality of molding devices includes:
  a first hollow space; and
  a plurality of feeding ports communicable with the first hollow space and correspondingly engageable with the outlets;

an insulator disposed between one of the plurality of discharging channels and one of the plurality of molding devices, wherein the insulator is configured to maintain a temperature difference between the one of the plurality of discharging channels and the one of the plurality of molding devices, wherein the plurality of discharging channels are extendable into the insulator and thereby at least partially surrounded by the insulator, each of the plurality of the molding devices further includes an upper mold base having openings and a mold disposed under the upper mold base, the mold defines the first hollow space, and each of the plurality of discharging channels is engageable with corresponding one of the openings of the upper mold base.

11. The injection-molding system of claim 10, wherein a thickness of one of the upper mold bases is less than a length of each of the plurality of discharging channels.

12. The injection-molding system of claim 10, wherein at least one of the plurality of the discharging channels further includes a heater disposed thereon.

13. The injection-molding system of claim 10, wherein at least one of the plurality of molding devices further includes a heater disposed adjacent to one of the plurality of feeding ports.

14. The injection-molding system of claim 10, wherein at least one of the plurality of the molding devices includes a second hollow space adjacent to and isolated from the first hollow space.

15. The injection-molding system of claim 10, wherein the insulator includes fiber glass.

16. The injection-molding system of claim 10, wherein the insulator is disposed on the one of the plurality of molding devices.

17. The injection-molding system of claim 10, wherein at least one of the plurality of the molding devices further includes a pressure-regulating system, the pressure-regulating system includes a junction point in connection with the first hollow space and a first gas conduit coupled to the junction point.

18. The injection-molding system of claim 17, wherein the plurality of the feeding ports and the junction point are disposed oppositely with respect to the first hollow space.

19. The injection-molding system of claim 17, wherein the pressure-regulating system further includes a second gas conduit coupled to the first gas conduit and configured to discharge gas from the first hollow space.

* * * * *